(12) United States Patent
Sakaue

(10) Patent No.: US 7,916,352 B2
(45) Date of Patent: Mar. 29, 2011

(54) IMAGE PROCESSING APPARATUS, IMAGE PROCESSING METHOD, PROGRAM, AND RECORDING MEDIUM

(75) Inventor: Tsutomu Sakaue, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 606 days.

(21) Appl. No.: 11/768,537

(22) Filed: Jun. 26, 2007

(65) Prior Publication Data
US 2008/0002230 A1   Jan. 3, 2008

(30) Foreign Application Priority Data

Jun. 30, 2006   (JP) .................................. 2006-182186

(51) Int. Cl.
G06T 5/00       (2006.01)
H04N 1/407      (2006.01)
H04N 1/409      (2006.01)

(52) U.S. Cl. ....... 358/3.27; 358/1.9; 358/3.26; 358/532; 358/533; 382/254; 382/263; 382/264; 382/266

(58) Field of Classification Search .................. 358/358, 358/3.26–3.27, 532; 382/254–269
See application file for complete search history.

(56) References Cited

U.S. PATENT DOCUMENTS

| | | | | |
|---|---|---|---|---|
| 5,459,587 A | * | 10/1995 | Fukushima | 358/462 |
| 5,687,006 A | * | 11/1997 | Namizuka et al. | 358/462 |
| 5,912,744 A | * | 6/1999 | Nakane | 358/447 |
| 6,049,635 A | * | 4/2000 | Hayashi et al. | 382/266 |
| 6,233,060 B1 | * | 5/2001 | Shu et al. | 358/1.9 |
| 6,272,260 B1 | * | 8/2001 | Furukawa et al. | 382/261 |
| 6,320,676 B1 | * | 11/2001 | Yoshidome | 358/1.9 |
| 6,658,280 B1 | * | 12/2003 | Haacke | 600/410 |
| 6,707,951 B1 | * | 3/2004 | Suzuki et al. | 382/260 |
| 6,983,076 B2 | * | 1/2006 | Curry et al. | 382/260 |
| 7,092,124 B2 | * | 8/2006 | Nabeshima et al. | 358/1.9 |
| 7,324,247 B2 | * | 1/2008 | Nishida | 358/540 |
| 7,532,767 B2 | * | 5/2009 | Oztan et al. | 382/268 |
| 2002/0172431 A1 | * | 11/2002 | Atkins et al. | 382/260 |
| 2004/0218235 A1 | * | 11/2004 | Kawano | 358/505 |

FOREIGN PATENT DOCUMENTS

| | | |
|---|---|---|
| JP | 11-266362 A | 9/1999 |
| JP | 2000152006 A | 5/2000 |
| JP | 2002-281313 A | 9/2002 |
| JP | 2004320447 A | 11/2004 |
| JP | 2005026824 A | 1/2005 |
| JP | 2005-039484 A | 2/2005 |

* cited by examiner

Primary Examiner — King Y Poon
Assistant Examiner — Richard Zhu
(74) Attorney, Agent, or Firm — Fitspatrick, Cella, Harper & Scinto

(57) ABSTRACT

An original image is scanned for respective pixels to determine attributes indicating features for respective pixels of the scanned document. Pixel values included in an M×M area (where M is a natural number) including a pixel of interest are weighted, the pixel value of the pixel of interest is changed based on the weighted pixel values, and smoothing processing is applied to pixels included in that area. Upon applying the smoothing processing, a size of a filtering area used for the smoothing processing is reduced to a size of an N×N area (where N is a natural number, with M>N) including the pixel of interest according to the determined attributes.

7 Claims, 21 Drawing Sheets

FIG. 12A

| 1 | 1 | 1 | 1 | 1 |
|---|---|---|---|---|
| 1 | 3 | 3 | 3 | 1 |
| 1 | 3 | 24 | 3 | 1 |
| 1 | 3 | 3 | 3 | 1 |
| 1 | 1 | 1 | 1 | 1 |

FIG. 12B

| 0 | 0 | 0 | 0 | 0 |
|---|---|---|---|---|
| 0 | 0 | −32 | 0 | 0 |
| 0 | −32 | 192 | −32 | 0 |
| 0 | 0 | −32 | 0 | 0 |
| 0 | 0 | 0 | 0 | 0 |

FIG. 13A

| I(0, 0) | I(1, 0) | I(2, 0) |
|---|---|---|
| I(0, 1) | I(1, 1) | I(2, 1) |
| I(0, 2) | I(1, 2) | I(2, 2) |

| F(0, 0) | F(1, 0) | F(2, 0) |
|---|---|---|
| F(0, 1) | F(1, 1) | F(2, 1) |
| F(0, 2) | F(1, 2) | F(2, 2) |

FIG. 13C

$$Div = F(0, 0) + F(1, 0) + F(2, 0) +$$
$$F(0, 1) + F(1, 1) + F(2, 1) +$$
$$F(0, 2) + F(1, 2) + F(2, 2)$$
EQUATION (13a)

$$Com = I(0, 0) * F(0, 0) + I(1, 0) * F(1, 0) + I(2, 0) * F(2, 0) +$$
$$I(0, 1) * F(0, 1) + I(1, 1) * F(1, 1) + I(2, 1) * F(2, 1) +$$
$$I(0, 2) * F(0, 2) + I(1, 2) * F(1, 2) + I(2, 2) * F(2, 2)$$
EQUATION (13b)

$$Val = Com / Div$$
EQUATION (13c)

FIG. 17

| HALFTONE DOT | CHARACTER | ATTRIBUTE |
|---|---|---|
| ✕ | ✕ | 0 : BACKGROUND |
| ✕ | ○ | 1 : CHARACTER |
| ○ | ✕ | 2 : HALFTONE DOT |
| ○ | ○ | — |

# IMAGE PROCESSING APPARATUS, IMAGE PROCESSING METHOD, PROGRAM, AND RECORDING MEDIUM

BACKGROUND OF THE INVENTION

1. Field of the Invention

The present invention relates to an image processing apparatus for applying optimal image processing in accordance with image features included in an original image, an image processing method, a program, and a recording medium.

2. Description of the Related Art

As an image processing apparatus for applying optimal image processing according to image features, an apparatus which extracts a character edge using a primary or secondary derivative to classify an image into a character area and a remaining (i.e., non-character) area, and then applies adaptive processing is known.

Also, an apparatus which processes the edge of a character drawn in a halftone dot area to look sharper, when the pixel to be processed is located within a halftone dot area and neighbors a pixel that forms the edge of a character or the like, is known. For example, see patent reference 1: Japanese Patent Laid-Open No. 2002-281313.

The aforementioned technique reduces the weight of smoothing processing for a specific part in an area to be smoothed. However, since the weight of the specific part is reduced, smoothing arithmetic operations become complicated.

In general, the smoothing processing makes a convolution operation on pixel values in the area to be smoothed with weighting coefficients, and divides the result of the convolution operation by the sum of the weighting coefficients. At this time, when a specific weighting coefficient is reduced, the division coefficient is changed, resulting in a complicated arrangement upon hardware implementation. When a weighting coefficient that does not change the division coefficient is used, its value is limited, and the same effect cannot be expected. Furthermore, when a change in division coefficient is ignored, the desired effect cannot be expected, and image quality may deteriorate. In addition, when change is performed so as to reduce the weight, the processing cannot provide a gain of desired space frequency response, and the level of smoothing becomes insufficient. Further, when a part of the weight is set to "0", isotropy of filter processing is lost and the effective condition of filtering is different depending on the direction. As a result, image quality lacking in uniformity might occur.

As another issue, upon switching filters between a character part and other parts (photo part, halftone part, background part, and the like) on a document with a white background, it is desired to apply emphasis processing to the character part and smoothing processing to other parts. When this is done, however, a contour may be generated around the character part. This is because the character emphasis processing is applied to the character part, but a background part around the character part is determined as a part other than the character part (i.e., a non-character part) and undergoes the smoothing processing. When the smoothing filter size is large, signals of the character part also undergo smoothing, and a contour is generated around the characters.

The aforementioned method is one of the solutions, but it suffers from the aforementioned problems which remain unsolved.

SUMMARY OF THE INVENTION

The present invention provides an image processing apparatus and method, which suppress bordering generated around a character part and can improve the quality of characters.

According to one aspect of the present invention, there is provided an image processing apparatus comprising: an attribute determination unit adapted to determine attributes of features for respective pixels of an original image scanned by an image scanning unit; and a smoothing processing unit adapted to weight pixel values included in an M×M (where M is a natural number) area including a pixel of interest, to change a pixel value of the pixel of interest based on the weighted pixel values, and to apply smoothing processing to pixels in a filtering area used for the smoothing processing, wherein the smoothing processing unit reduces, to a size of an N×N (where N is a natural number, with M>N) area including the pixel of interest, a size of the filtering area to apply the smoothing processing in accordance with the attributes determined by the attribute determination unit.

According to one aspect of the present invention, there is provided an image processing method comprising: an attribute determination step of determining attributes of features for respective pixels of an original image scanned by an image scanning unit; and a smoothing processing step of weighting pixel values included in an M×M (M being a natural number) area including a pixel of interest, changing a pixel value of the pixel of interest based on the weighted pixel values, and applying smoothing processing to pixels in a filtering area used for the smoothing processing, wherein in the smoothing processing step, a size of the filtering area is reduced to a size of an N×N (N being a natural number, with M>N) area including the pixel of interest in accordance with the attributes determined in the attribute determination step.

Further features of the present invention will become apparent from the following description of exemplary embodiments with reference to the attached drawings.

BRIEF DESCRIPTION OF THE DRAWINGS

FIGS. 12A and 12B show examples of filter coefficients used in filtering;

FIGS. 13A to 13C show an example of a convolution operation as filtering;

FIG. 17 is a table for explaining attributes indicating to which of a character area, halftone area, background area, and the like the pixel of interest belongs;

DESCRIPTION OF THE EMBODIMENTS

The best mode for carrying out the invention will be described in detail hereinafter with reference to the accompanying drawings.

Figure 1:
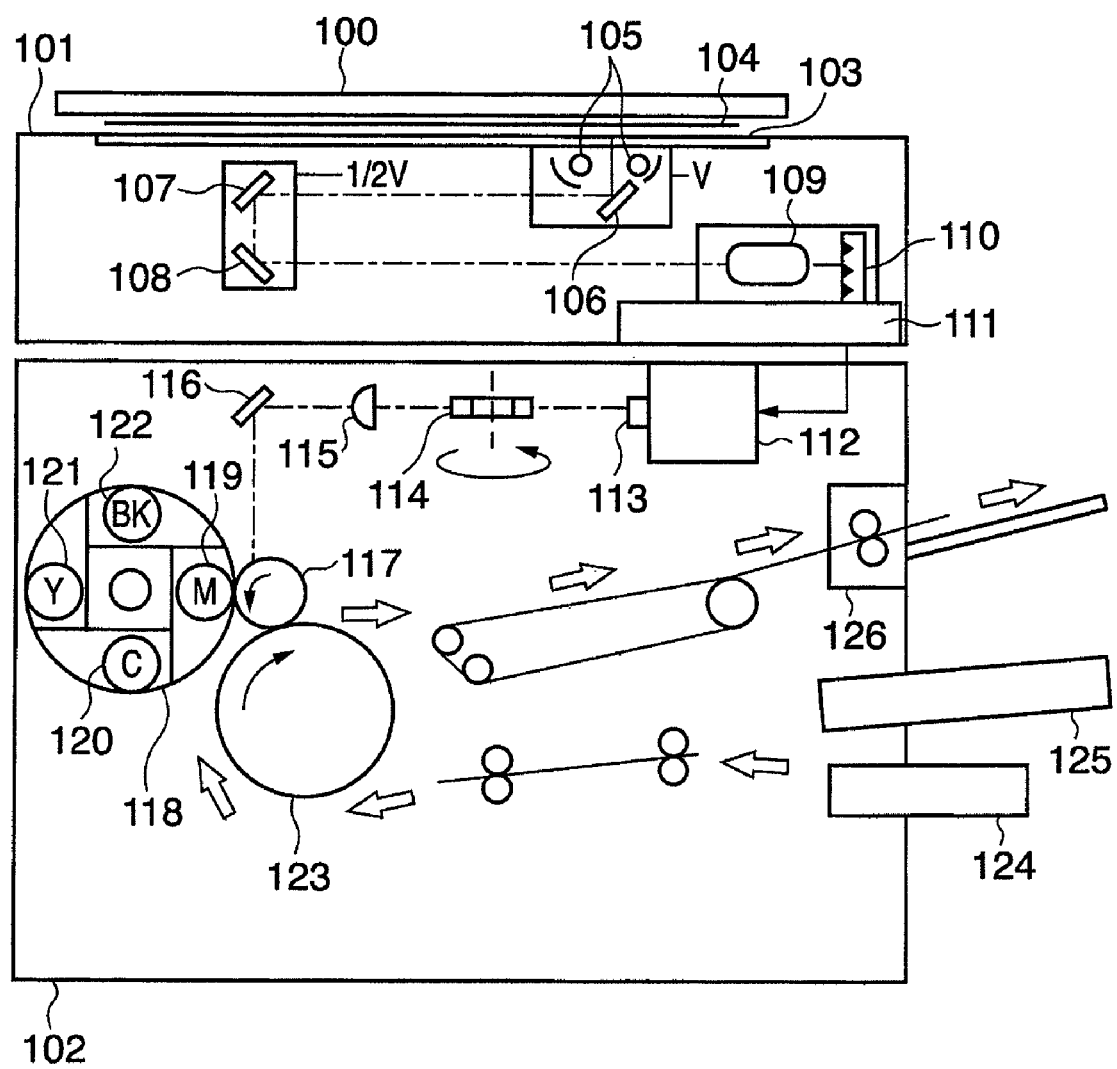
FIG. 1 is a side sectional view showing the arrangement of a color document copying apparatus which digitally scans a color original image and generates a copy image.

FIG. 1 is a side sectional view showing the arrangement of a color document copying apparatus which digitally scans a color original image and generates a copy image. Referring to FIG. 1, reference numeral 101 denotes an image scanner unit, which scans an original image and executes digital signal processing. On the other hand, reference numeral 102 denotes a printer unit, which prints out a full-color image corresponding to the original image scanned by the image scanner unit 101 on a sheet.

In the image scanner unit 101, reference numeral 100 denotes a mirror-surface pressure plate. A document 104 on a document table glass (to be referred to as a "platen" hereinafter) 103 is irradiated with light coming from a lamp 105, and reflected light is guided by mirrors 106 to 108. The reflected light forms an image on a 3-line, solid-state image sensing element (to be referred to as a "CCD" hereinafter) 110 via a lens 109, and three image signals of red (R), green (G), and blue (B) as full-color information are sent to an image processor 111.

Note that the lamp 105 and mirror 106, and the mirrors 107 and 108 mechanically move at velocities v and (½)v, respectively, in a direction perpendicular to an electric scan (main scan) direction of the line sensor to scan (sub-scan) the entire surface of the document. The document 104 is scanned at the resolution of 400 dpi in both the main scan and sub-scan directions.

The image processor 111 electrically processes the R, G, and B image signals to separate them into magenta (M), cyan (C), yellow (Y), and black (Bk) components, and supplies these components to the printer unit 102. One of the M, C, Y, and Bk components is sent to the printer unit 102 per document scan of the image scanner unit 101 to complete a print-out by a total of four document scans.

The M, C, Y, and Bk image signals sent from the image scanner unit 101 are sent to a laser driver 112. The laser driver 112 modulates and drives a semiconductor laser 113 in accordance with the incoming image signals. A laser beam scans the surface of a photosensitive drum 117 via a polygonal mirror 114, f–θ lens 115, and mirror 116. Note that an image is written at a resolution of 400 dpi in both the main scan and sub-scan directions as in scanning.

A rotary developing device 118 includes a magenta developer 119, cyan developer 120, yellow developer 121, and black developer 122. These four developers alternately contact the photosensitive drum 117 to develop an electrostatic latent image formed on the photosensitive drum 117 with toner.

A transfer drum 123 winds a sheet fed from a paper cassette 124 or 125 around itself, and transfers a toner image on the photosensitive drum 117 to the sheet.

After the four colors M, C, Y, and Bk are transferred in turn, the sheet passes through a fixing unit 126 to fix the toner images onto the sheet. After that, the sheet is ejected.

An apparatus, in which the image scanner unit 101 and printer unit 102 operate independently, normally adopts an arrangement having a storage unit that temporarily stores image data. Image data input from the image scanner unit 101 undergoes scanner image processing in the image processor 111, and is temporarily held in the storage unit. Upon printing that image data, the image data held in the storage unit is sent to the image processor 111, and undergoes print image processing. After that, the image data is sent to the printer unit 102, and is printed out.

Figure 2:
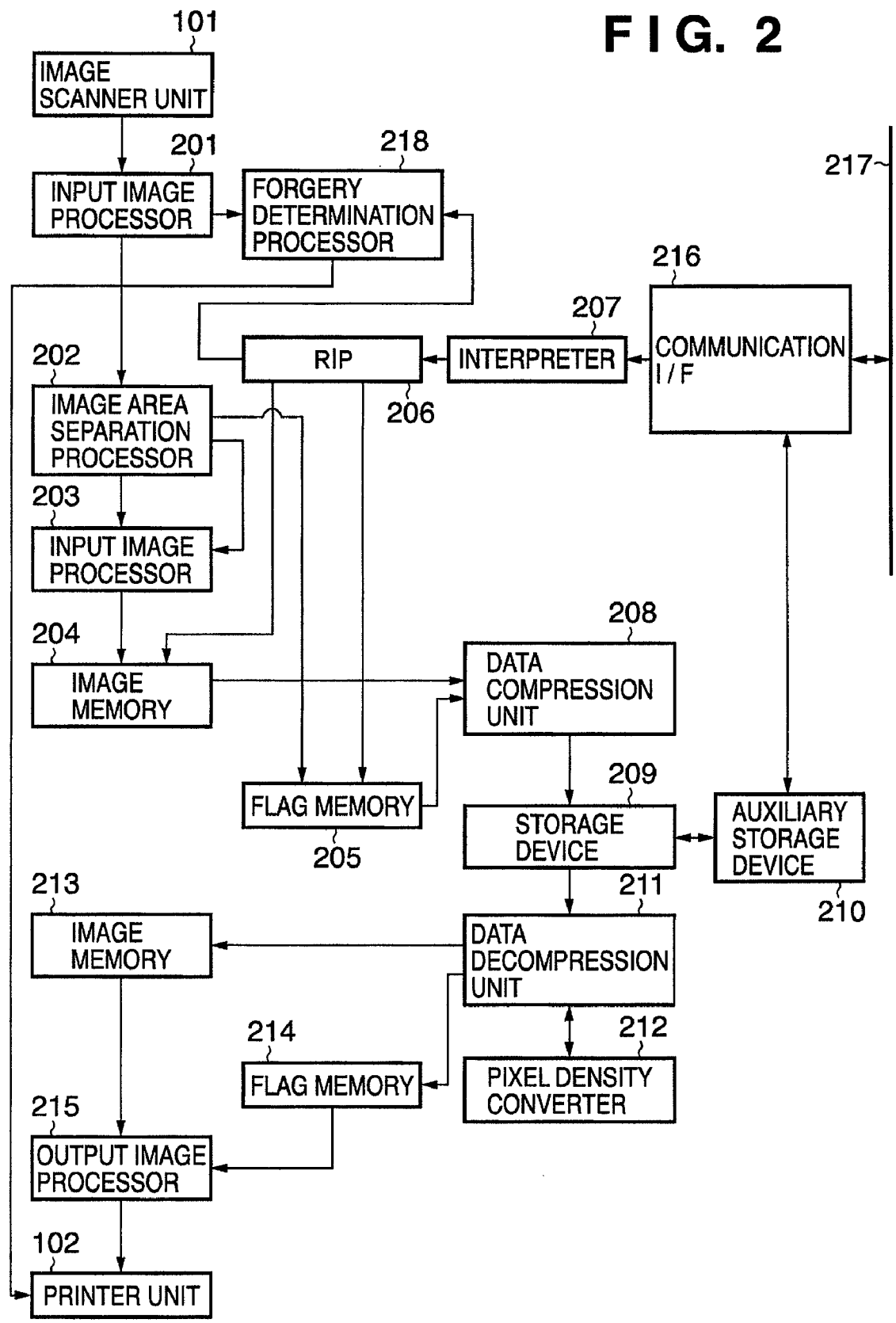
FIG. 2 is a block diagram showing the arrangement of an apparatus in which an image scanner unit 101 and printer unit 102 operate independently.

FIG. 2 is a block diagram showing the arrangement of the apparatus in which the image scanner unit 101 and printer unit 102 operate independently. An input image processor 201 processes image data scanned by the image scanner unit 101, and an image region separation processor 202 detects attribute data of images from the processed image data. Note that the detected attribute data are held in a flag memory 205 as a character flag and color flag. The image data undergoes adaptive processing by an input image processor 203, and is then held in an image memory 204 according to the attribute data.

The temporarily held image data undergoes adaptive processing by an output image processor 215 in accordance with the attribute data, and is then output from the printer unit 102.

[Input Image Processing]

A document to be copied is placed on the platen 103 of the image scanner unit 101, and is scanned. The original image is digitally scanned for respective pixels by the 3-line color CCD 110, and is transferred as color image signals to the input image processor 201. The input image processor 201 applies, to RGB color image signals sent from the image scanner 101, known image processing such as shading correction, CCD line correction, color correction, and the like.

The image area separation processor 202 is a block which applies image area separation processing to the color image signals which have undergone the input image processing and are output from the input image processor 201. More specifically, the image area separation processor 202 detects image features such as a photo area, character area, halftone area, and the like for respective pixels of the input image, and generates signals indicating attributes for respective image areas.

[Image Area Separation Processing]

The image area separation processing in the image area separation processor 202 will be described in detail below. The image area separation processing is processing for extracting features of an original image required to apply optimal image processing in accordance with image features included in the original image, and generating signals (to be referred to as "flag data" hereinafter) indicating image area attributes. For example, a document normally includes various image areas such as a full-color photo area, a character area of black alone, a halftone print area like newspaper print, and the like together. When these areas are processed and output in an identical image processing sequence, the resulting output image normally cannot have a favorable image quality.

Figure 3:
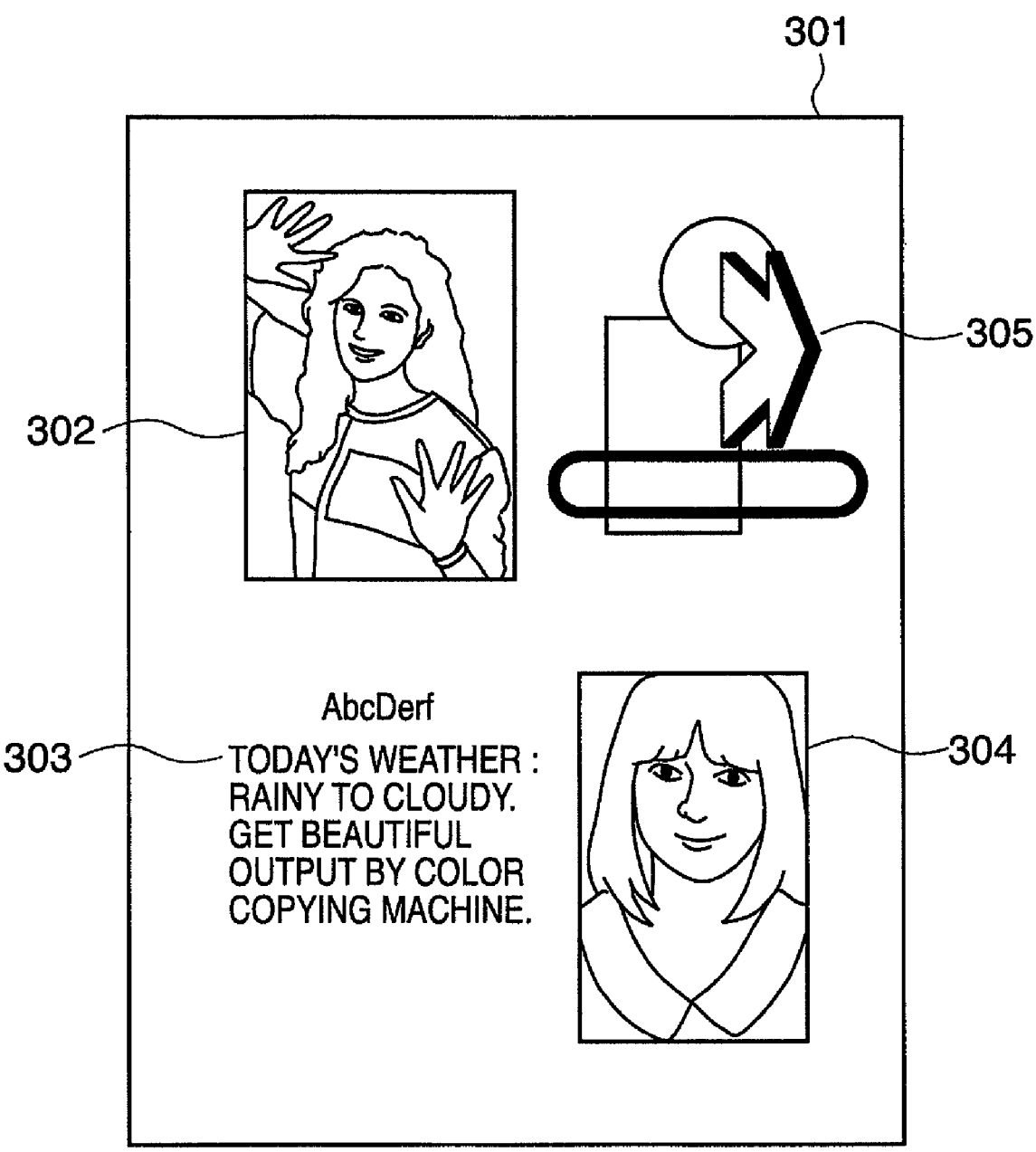
FIG. 3 shows an example of an original image.

Thus, in this embodiment, the attributes of image data included in an original image are detected using a color image signal input from the input image processor 201, and flag data used to identify the attributes are generated. FIG. 3 shows a practical sequence.

FIG. 3 shows an example of an original image. In the example shown in FIG. 3, one page 301 includes a silver halide photo area 302, black character area 303, halftone print area 304, and color graphic area 305 together.

The image scanner unit 101 scans this original image using the color CCD 110 to read it as color digital signals (R, G, and B) for respective pixels. The G signal values of those (R, G, and B) read by the CCD 110 for respective areas are plotted in the arrangement direction of the CCD, as denoted by reference numeral 401 shown in, for example, FIG. 4.

Figure 4:
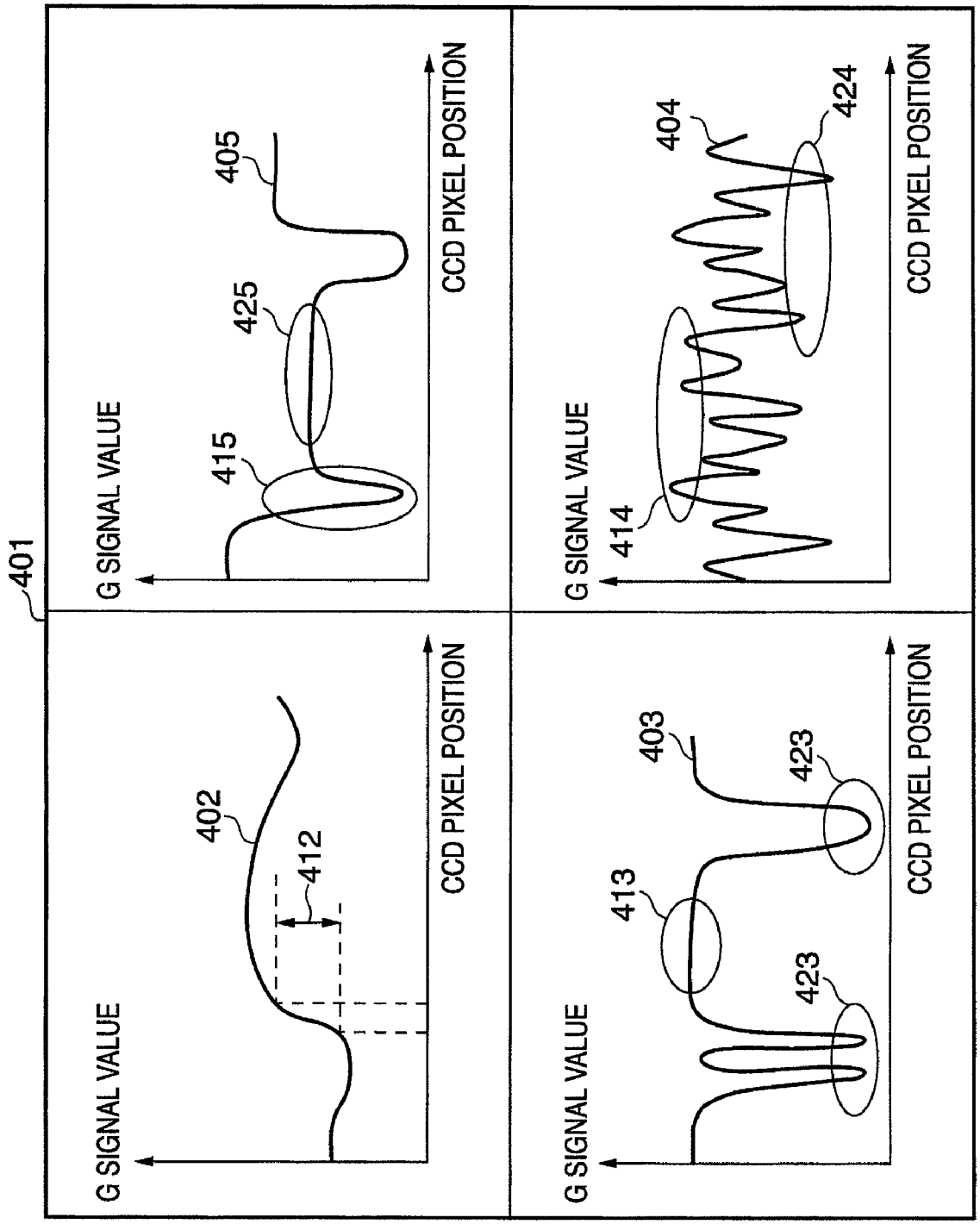
FIG. 4 shows examples of plots (characteristics) of signal values which characteristically appear upon scanning areas shown in FIG. 3.

In FIG. 4, reference numerals 402 to 405 denote plots (characteristics) of signal values which characteristically appear upon scanning the areas 302 to 305 shown in FIG. 3. The abscissa represents the pixel positions in the CCD arrangement direction, and the ordinate represents the read signal values: a pixel is closer to white (brighter) with increasing G signal value.

Features of respective areas will be described below. In the silver halide photo area 302, the characteristics 402 of the scanned image signal values are relatively slow, and a difference 412 of near-distance pixel values assumes a small value. The black character area 303 has the characteristics 403 in which the scanned signal values abruptly change from a white background part 413 to a character part 423, since black characters are written on a white background.

The halftone print area 34 has the characteristics 404 in which white and black repetitively appear at high frequencies of occurrence, since a white background 414 and halftone dots 424 printed on that background repetitively appear in the halftone area. The color graphic area 305 has the characteristics 405 in which signal values abruptly become small at an edge part 415 of a graphic, and a given intermediate level continues on an inner paint part 425.

The attributes of these areas can be determined by detecting the aforementioned features for respective areas from the read signal values. That is, a known attribute determination method based on the amount of change of image data near the pixel of interest or the integrated value of the amounts of change within a given period, the luminance values (white or color background) of surrounding pixels, the number of times of changes from white to black of image data within a given period, and the like may be used.

Figure 5A:
FIGS. 5A to 5C show examples of flag data generated upon making attribute determination for an original image 301 shown in FIG. 3.
Figure 5B:
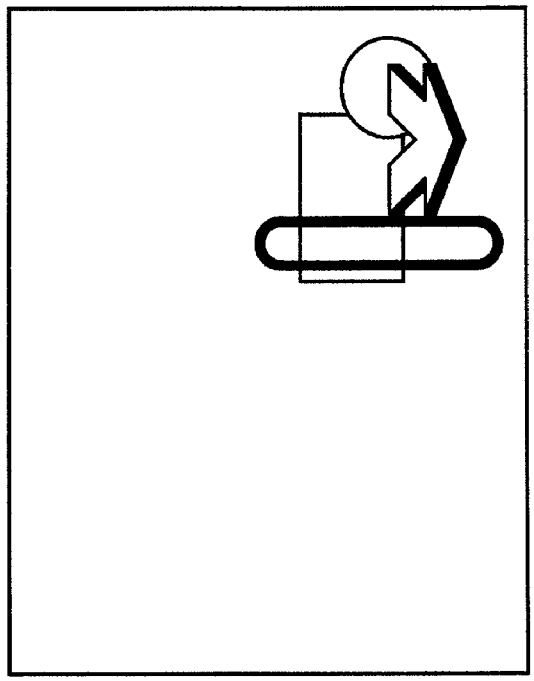
Figure 5C:
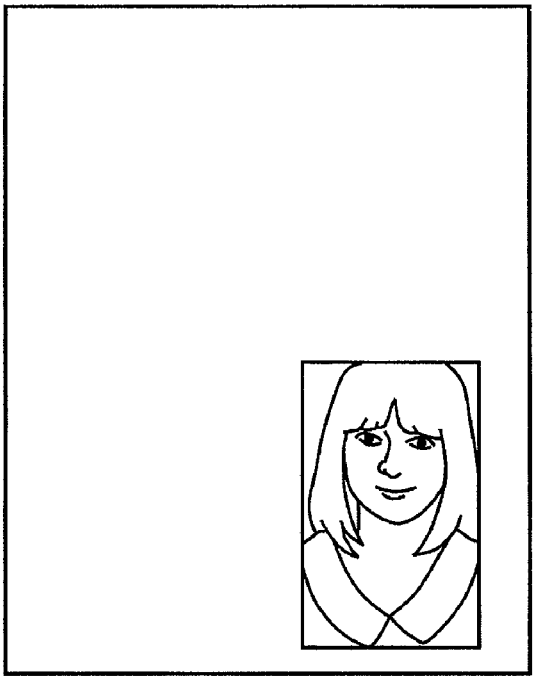

FIGS. 5A to 5C show examples of flag data generated upon making attribute determination for the original image 301 shown in FIG. 3. In this case, three different attribute flags, that is, a character flag, graphic flag, and halftone flag, are generated as the flag data. Of course, the present invention is not limited to only these flags. A character flag shown in FIG. 5A represents an area in which a character flag=1 is generated for each pixel which is expressed by black in FIG. 5A and has a character attribute, and a character flag=0 (white part in FIG. 5A) is generated for the remaining pixels. A graphic flag shown in FIG. 5B represents an area in which a graphic flag=1 is generated for pixels that form the color graphic area, and a graphic flag=0 is generated for the remaining pixels. A halftone flag shown in FIG. 5C represents an area in which a halftone flag=1 is generated for pixels that form the halftone area, and a halftone flag=0 is generated for the remaining pixels.

Note that the photo area does not fit any of these areas, and is not included in FIGS. 5A to 5C, since the values of all flags are zero.

[Color Determination]

Figure 6:
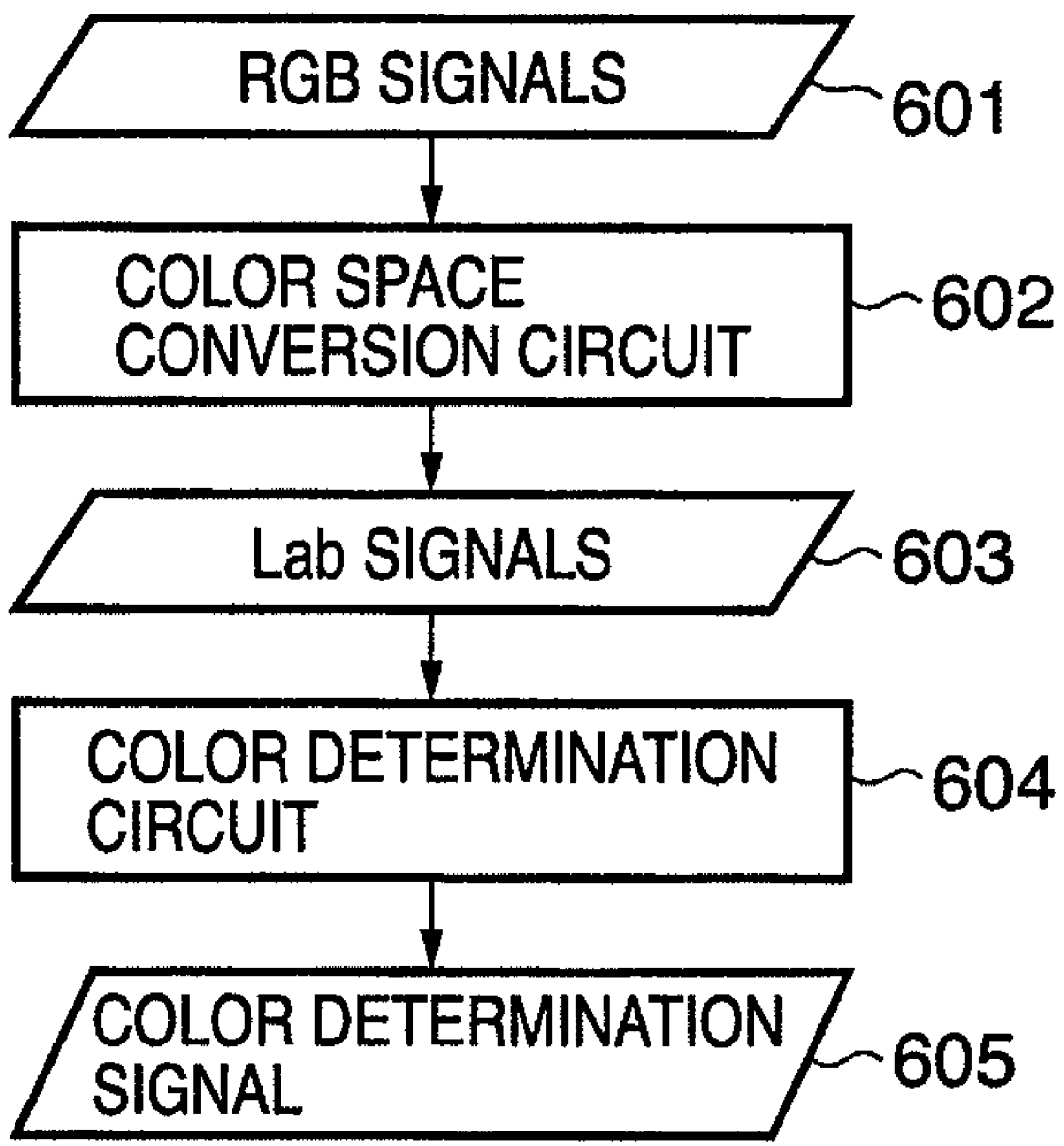
FIG. 6 is a diagram for explaining an example of a color flag generation method.

An example of a color flag generation method will be described below with reference to FIG. 6. Whether or not a certain pixel of image data is a color pixel can be easily determined by mapping the chromaticity of that pixel on a color space. A Lab color space will be taken as an example. The Lab color space is a color space proposed by the CIE (Commission Internationale de l'Eclairage), 1976. L represents the lightness (brightness), a represents the chromaticity from red to green, and b represents the chromaticity from blue to yellow. The Lab color space allows accurate color determination since it is corrected so that an amount of change on a three-dimensional color space is proportional to the impression of a visible color change caused by that change.

A color space conversion circuit 602 which converts RGB signals 601 into Lab signals 603 will be exemplified below. Normally, XYZ tristimulus values are temporarily calculated from RGB signals, and Lab signal values are then derived from the XYZ tristimulus values. The conversion executed by the color space conversion circuit 602 will be described below. However, conversion coefficients are not limited to those to be described below since they depend on the devices being used.

$$X = 0.412391 \times R + 0.357584 \times G + 0.180481 \times B$$

$$Y = 0.212639 \times R + 0.715169 \times G + 0.072192 \times B$$

$$Z = 0.019331 \times R + 0.119195 \times G + 0.950532 \times B$$

$$L = 116(Y/Y0)(1/3) - 16$$

$$a = 500\{(X/X0)(1/3) - (Y/Y0)(1/3)\}$$

$$b = 200\{(Y/Y0)(1/3) - (Z/Z0)(1/3)\}$$

where X0, Y0, and Z0 are tristimulus values of standard light.

Whether a given pixel is a chromatic or an achromatic pixel is determined by mapping the ab values of that pixel, which are calculated from the above equations, on the orthogonal coordinate system. This determination is made by a color determination circuit 604, and the determination result is output as a color determination signal 605.

Figure 7:
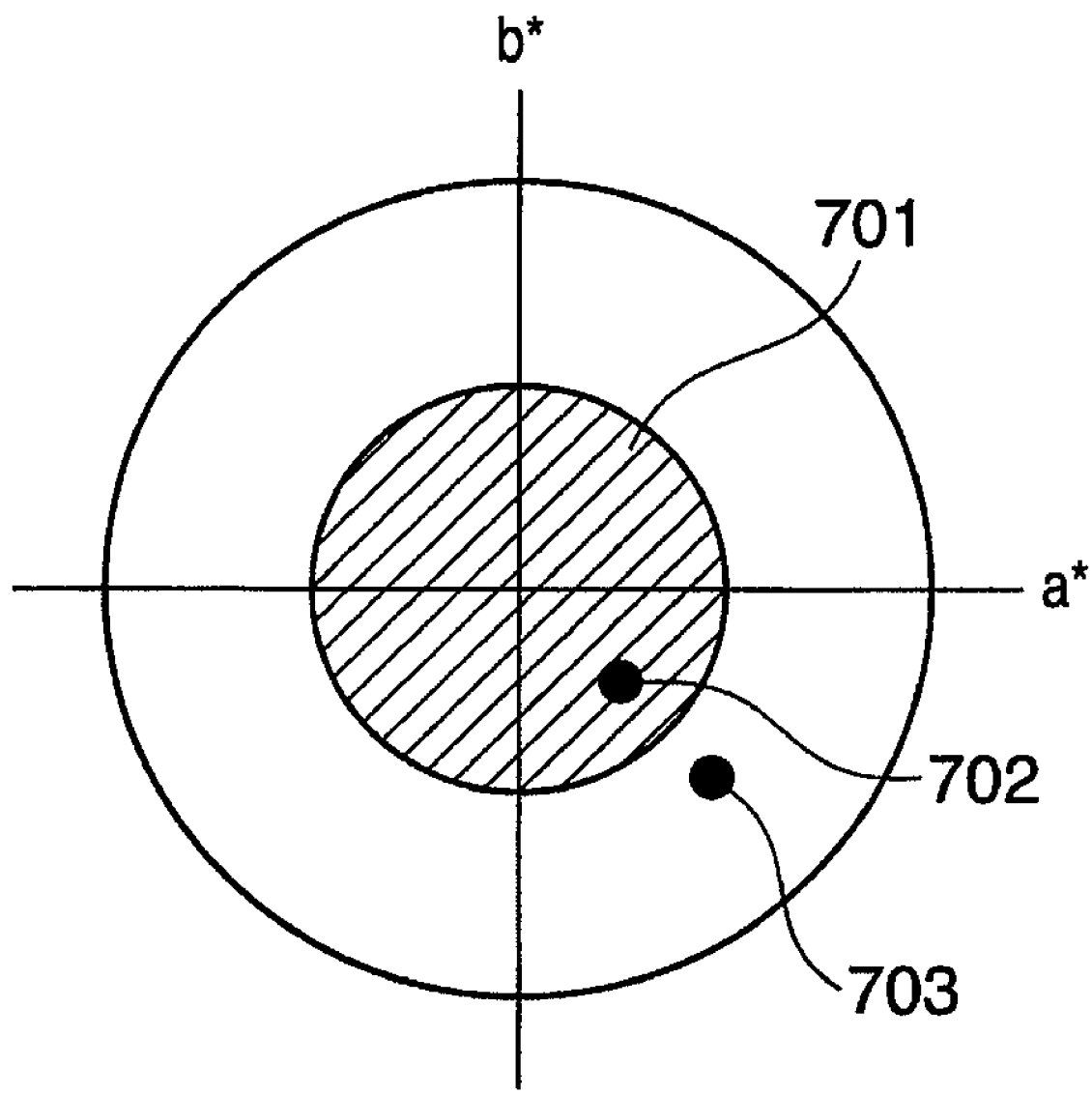
FIG. 7 is a view for explaining determination as to whether or not the pixel of interest is a chromatic or achromatic pixel on the orthogonal coordinate system.

FIG. 7 is a view for explaining determination as to whether or not a given pixel is a chromatic or achromatic pixel on the orthogonal coordinate system. An a* axis and b* axis shown in FIG. 7 indicate respective axes of the orthogonal coordinate system. For example, when saturation is used as a reference in determination of a chromatic or achromatic pixel, the intersection of the a* and b* axes, that is, an origin becomes a point of zero color component. The saturation becomes larger as a point is separated away from the origin, that is, as the a and b values become larger. In this saturation change process, a chromatic or achromatic pixel is determined to have a given level as a threshold.

For example, assuming that a hatched area 701 is an achromatic area, when the ab values of a certain pixel are plotted at a point 702 inside the hatched area 701, it is determined that the pixel is an achromatic pixel. On the other hand, when the ab values of another pixel are plotted at a point 703 outside the hatched area 701, it is determined that the pixel is a chromatic pixel.

With the aforementioned method, whether a given pixel is a chromatic or an achromatic pixel is determined. The conversion to the chromaticity values has been explained using Lab. However, the present invention is not limited to this specific color space. Furthermore, in order to reduce the amount of calculation, simpler conversion formulas may be used instead.

Upon detection of image attributes for respective pixels by the aforementioned image area separation processing, the input image processor 203 executes image processing according to the image attributes. In this case, the input image processor 203 executes the following processing: for example, high-frequency components of an image are emphasized for the character area to enhance the sharpness of each character, and moiré components unique to a digital image are removed using a so-called low-pass filter for the halftone area. These processes are switched for respective pixels in accordance with the flag data generated by the image area separation processor 202.

[Image Data Storage]

The image data which has been scanned by the image scanner unit 101 and has undergone various kinds of input image processing, and the flag data generated in the aforementioned sequence are respectively temporarily stored in the image memory 204 and flag memory 205. Note that the image data and flag data are stored as full image data for one page of a document or partial image data for a predetermined size of the page.

The temporarily stored image data and flag data are compressed by a data compression unit 208, and the compressed data are stored in a storage device 209. The storage device 209 preferably comprises a high-speed storage device such as a semiconductor storage device.

The data compression unit 208 applies different data compression processes to the image data and flag data, respectively. More specifically, the data compression unit 208 desirably applies lossy but high-efficiency compression processing such as JPEG compression to the image data so as to obscure deterioration of an image in consideration of the human visual characteristics. Also, the data compression unit 208 desirably uses a lossless compression method such as JBIG compression for the flag data so as to prevent omissions and changes of attribute flag information.

In this way, the storage device 209 stores the image data and attribute flag data which have undergone different compression processes for one page of a document. Note that the stored image data may be written out to an auxiliary storage device 210. The auxiliary storage device 210 desirably adopts a medium such as a hard disk which has a slightly low recording speed but can store large-capacity data. In this way, original images of a large number of pages can be efficiently stored.

[Image Data Read]

The image data and attribute flag data stored in the storage device 209 and/or the auxiliary storage device 210 are read out so as to be output from the printer unit 102. A data decompression unit 211 decompresses these data, and writes them out to an image memory 213 and flag memory 214.

At this time, a pixel density converter 212 may convert the pixel density of the stored image data. This conversion processing is used, for example, when the stored image data is to be printed out at an enlarged or reduced scale, or when a plurality of stored pages are laid out and output onto one printout sheet.

Figure 8:
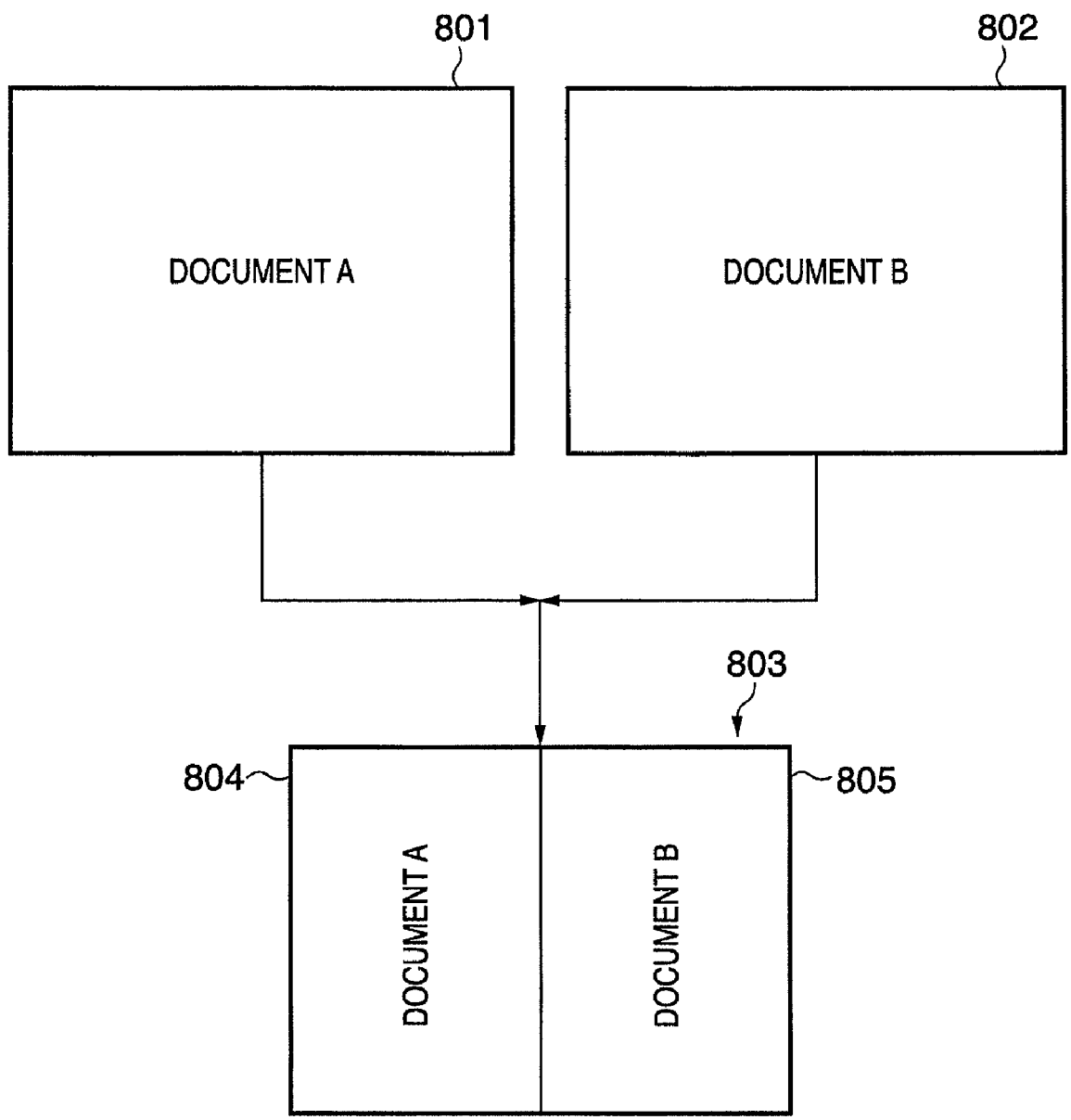
FIG. 8 shows an example upon combining and outputting a plurality of pages.

The combined output processing of a plurality of pages is done in a case shown in, for example, FIG. 8. That is, assume that two original images 801 and 802 are stored in advance in the storage device. In this case, these two original images are laid out on an output sheet having the same size as the document size to obtain a printout 803.

The stored image data 801 is read out first from the storage device, and the compressed data is decompressed. The pixel density converter 212 reduces the decompressed data to a predetermined scale, and a rotation processor (not shown) rotates that data 90° counterclockwise, thus writing the rotated data in a predetermined area (corresponding to an area 804 in FIG. 8) of the image memory 213.

Next, the image data 802 is read out, and similarly undergoes decompression, resolution conversion, and rotation processing, and is written into an area corresponding to an area 805 of the image memory 213. At this time, flag data corresponding to the image data 801 and 802 similarly undergo decompression, resolution conversion, and rotation processing, and are written in corresponding areas of the flag memory 214.

Note that it is desirable to adopt different methods for the resolution conversion of the image data and that of the flag data. For example, a known method such as linear interpolation, ternary spline interpolation, or the like can be applied to the image data. On the other hand, it is desirable to use a resolution conversion method suited to binary data such as nearest neighbor or the like for the resolution conversion of the flag data.

[Image Data Output]

Next, the image data and flag data temporarily stored in the image memory 213 and flag memory 214 are transferred to the output image processor 215 when they have reached a predetermined size. The output image processor 215 executes known image processing required to print out RGB image data, that is, luminance density conversion, RGB→CMYK conversion, gamma correction, binarization, and the like, and transfers the processed data to the printer unit 102.

In the printer unit 102, the laser driver 112 drives the semiconductor laser 113 based on the transferred CMYK image signals to form and output a visible image on a transfer sheet according to the aforementioned image forming process.

Note that the flag data stored in the flag memory 214 are used to switch the processes of the output image processor 215. That is, different coefficients of the RGB→CMYK conversion are used for the photo area and character area, thus improving the image quality of an output image. For example, for the character area, that is, pixels with the character flag=1, conversion coefficients that allow reproduction of black characters by only black toner (that is, coefficients which yield C, M, and Y=0 when image data is achromatic data) are applied. For other areas, coefficients that allow reproduction of velvety black without setting C, M, and Y=0 even for achromatic pixels are applied.

In the binarization processing, C, M, Y, and K signals are converted into binary signals "0" or "1" using known error diffusion or dithering. For the character area or graph area, error diffusion is applied since the sharpness of an output image is important. On the other hand, for the photo and halftone areas, dithering is applied since tonality matters. In this manner, by switching the contents of the binarization processing in accordance with the flag data, the image quality of an output image can be improved.

Figure 9:
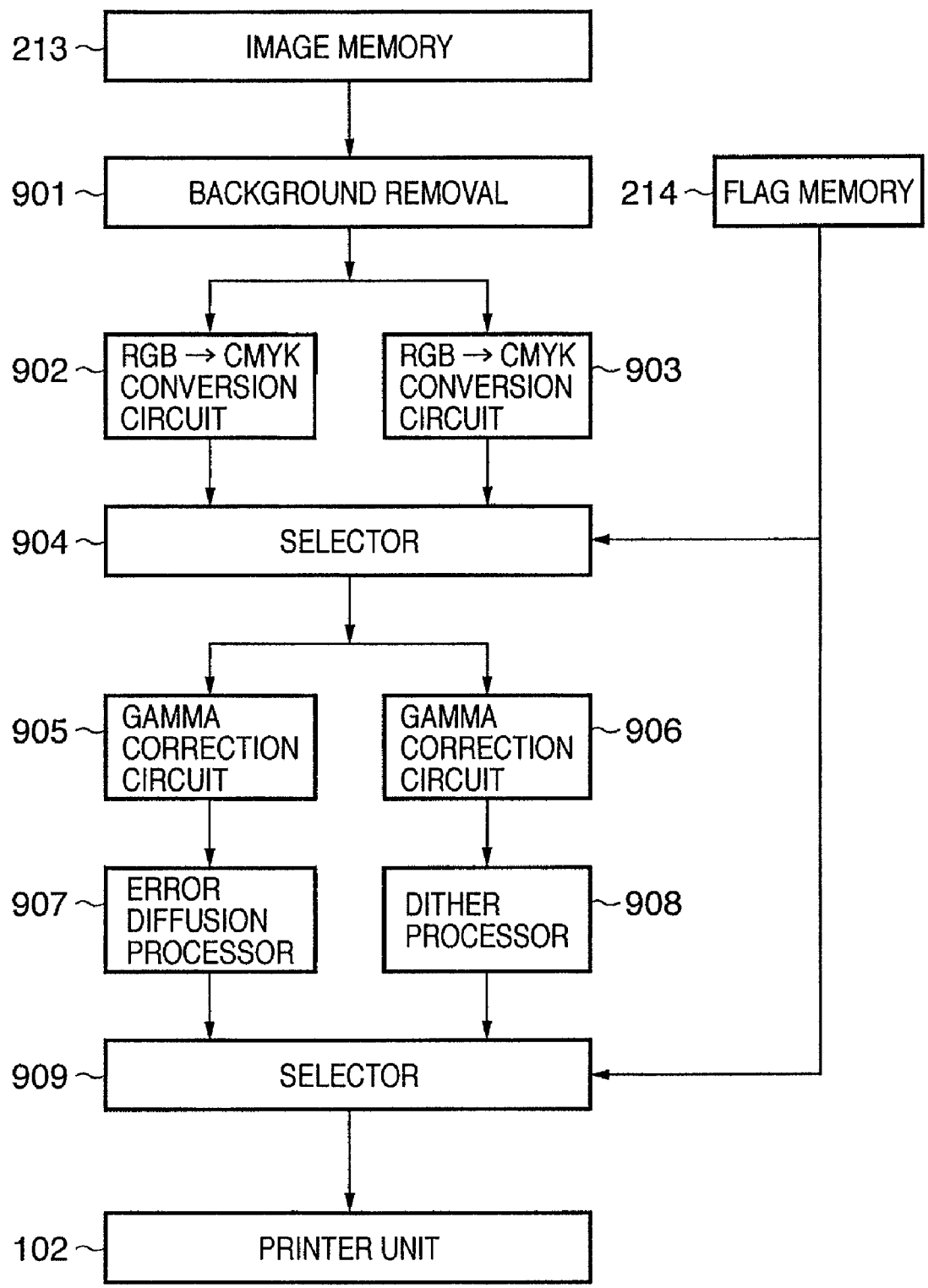
FIG. 9 is a block diagram showing processing executed when transferring image data stored in an image memory 213 to the printer unit 102.

FIG. 9 is a block diagram showing processing upon transferring image data stored in the image memory 213 to the printer unit 102. The same reference numerals in FIG. 9 denote the same components as in FIG. 2.

RGB color image data read out from the image memory 213 undergo background removal processing 901 in accordance with the background level of the scanned document. For example, it is often preferable even for paper with a slightly fogged background like recycled paper to reproduce its background color. Note that ON/OFF of the background removal processing 901 and the amount of removal can be automatically or manually controlled.

Next, the image data that have undergone the background removal processing are parallelly input to two RGB→CMYK conversion circuits 902 and 903, and are independently converted into CMYK image data. One of the CMYK image data outputs is selected by a selector 904 in accordance with the flag data in the flag memory 214. The conversion coefficients for the character area are set in the RGB→CMYK conversion circuit 902, and coefficients for other areas are set in the RGB→CMYK conversion circuit 903.

Note that the selector 904 selects the output from the RGB→CMYK conversion circuit 902 when the character flag=1, and the output from the RGB→CMYK conversion circuit 903 when the character flag=0.

The output from the selector 904 is parallelly split into two systems. One output is input from a gamma correction circuit 905 to a selector 909 as binary CMYK signals via an error diffusion processor 907. The other output is input from a gamma correction circuit 906 to the selector 909 as binary CMYK signals via a dither processor 908.

The selector 909 selects one of the outputs from the error diffusion processor 907 and dither processor 908, and transfers the selected output to the printer unit 102. Since the error diffusion is selected for the character area and graphic area, when the character flag=1 or graphic flag=1, the selector selects the output from the error diffusion processor 907; otherwise, it selects the output from the dither processor 908.

[Image Print]

Referring back to FIG. 2, representative image data which is input from an external communication path 217 via a communication I/F 216 is so-called PDL (page description language) data. An interpreter 207 converts the PDL data input from the communication I/F 216 into an intermediate language format called a display list. The interpreter 207 sends this display list to an RIP (Raster Image Processor) 206, which rasterizes the display list into bitmap data. The RIP 206 stores the rasterized image data in the image memory 204. At this time, the RIP 206 generates attribute information of the rasterized image data as flag data, and stores them in the flag memory 205 at the same time.

Note that flag data are generated for corresponding pixels of the rasterized image with reference to attribute information (photo, character, graphic, and the like) that PDL data input to the RIP 206 holds for respective components. That is, upon reception of a PDL command for generating a character component, the RIP 206 generates a bitmap image of this character data, and also a character flag=1 as flag data corresponding to an area where that character is generated at the same time.

[Forgery Determination Processing]

There are some methods for forgery determination processing of banknotes and the like to be executed by a forgery determination processor 218: a typical method is pattern matching. With this processing, features such as the shape, color, and the like of a banknote or a feature embedded on purpose are extracted, and the degrees of matching with stored features are checked to determine a forgery.

Figure 10:
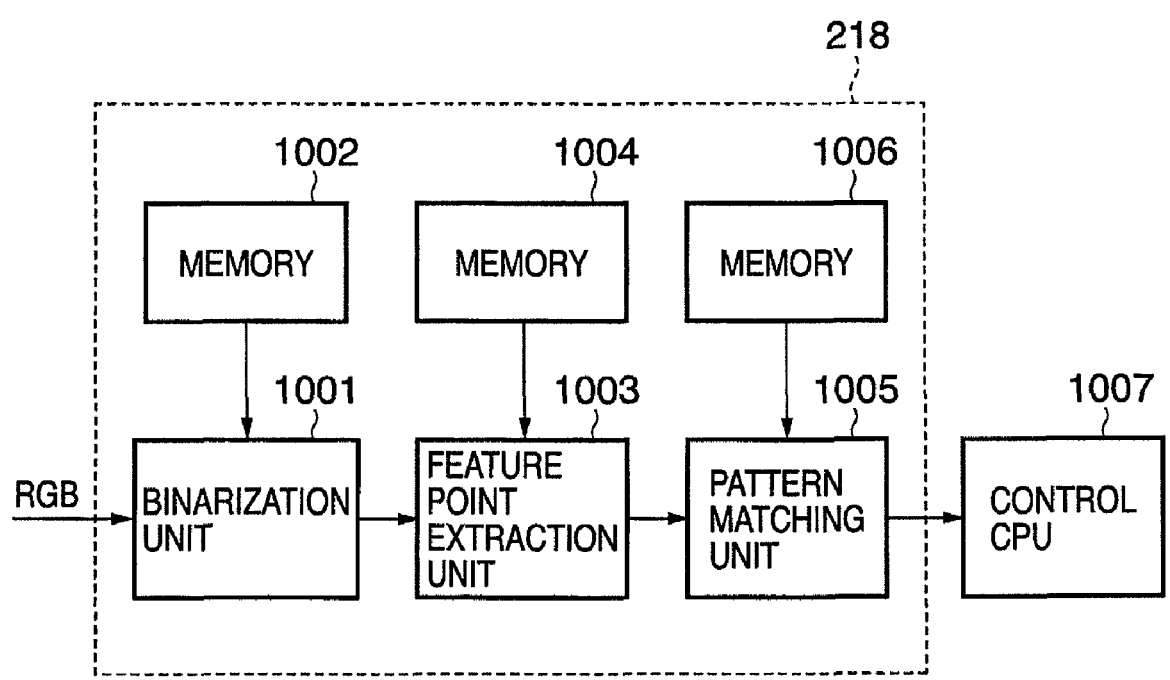
FIG. 10 is a block diagram showing an example of a forgery determination processor 218.

FIG. 10 is a block diagram showing an example of the arrangement of the forgery determination processor 218. The forgery determination processor 218 receives RGB image signals to be determined. A binarization unit 1001 binarizes the RGB image signals. A binarization threshold is variable, and is stored in a memory 1002.

Next, the binary signals are input to a feature point extraction unit 1003, and when they match a feature stored in a memory 1004, the feature point extraction unit 1003 extracts corresponding signals. Note that features stored in the memory 1004 include the shape, color, specific mark, and the like indicating those of a banknote. The stored features also include a feature embedded on purpose.

The extracted signals are input to a pattern matching unit 1005. When the input signals match a corresponding pattern in a memory 1006, the pattern matching unit 1005 sends a determination result to a control CPU 1007. Upon reception of the result indicating a forgery, the control CPU 1007 paints an image to be output by the printer unit 102, thus preventing the banknote from being forged.

The forgery determination processing to be executed in a copying machine has been exemplified. However, the present invention is not limited to this.

The aforementioned image processing system extracts features of an original image using the image area separation processing, and applies optimal image processing according to the image features included in the original image. For example, the system separates a photo part and character part in the original image, applies photo-oriented processing that attaches an importance on color tones and tonality to the photo part and character-oriented processing that attaches an importance on the sharpness to the character part, thus improving the image quality of a copy image. Also, the system detects color components of an image, and prints achromatic characters in black alone, thus improving the image quality.

However, depending on the precision and processing arrangement of the image area separation processing, when smoothing processing is applied in the vicinity of a character, noise like bordering is generated around that character, thus deteriorating the quality of the character.

Figure 11:
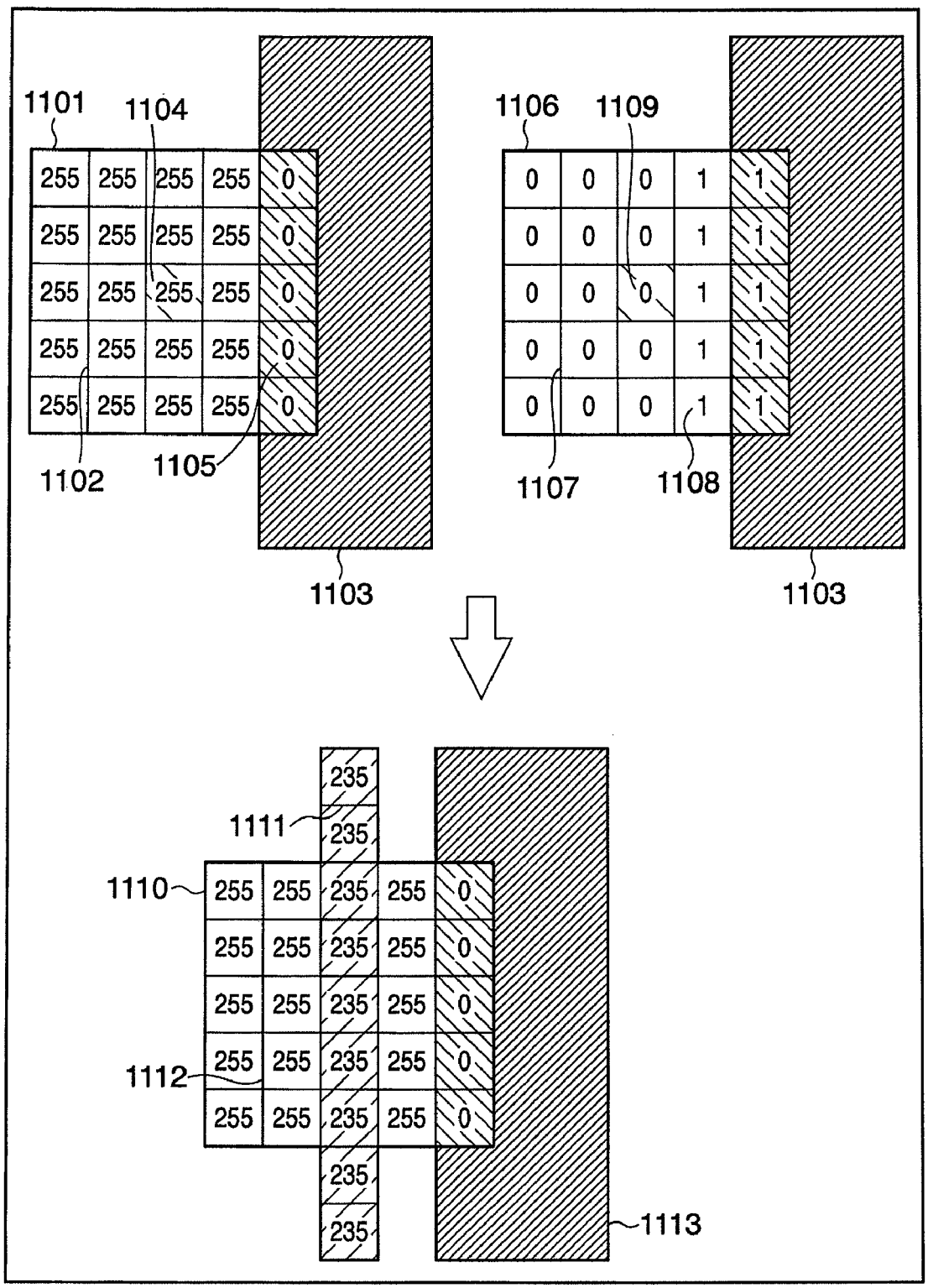
FIG. 11 is a view showing an example of generation of noise like bordering around a character.

FIG. 11 shows an example of generation of noise like bordering around a character. An image signal 1101 is obtained by partially extracting a white background 1102 and a black character edge 1103. Note that a read signal value is indicated by 8 bits for each of R, G, and B: the background 1102 has a "255" level (white), and the character edge 1103 has a "0" level (black). Reference numeral 1106 denotes attribute flags at the same positions. In the attribute flags 1106, character parts 1108 determined as a character attribute (attribute flag=1) and non-character parts 1107 determined as a non-character attribute (attribute flag=0) are illustrated. Based on the attribute flags 1106, an edge emphasis filter is used for the character parts 1108, and a smoothing filter is used for the non-character parts 1107.

FIGS. 12A and 12B show examples of filter coefficients used in filtering. FIG. 12A shows an example of smoothing coefficients used for the smoothing filter. On the other hand, FIG. 12B shows an example of edge emphasis coefficients used for the edge emphasis filter.

Note that filtering corresponds to a convolution operation, which is implemented by processing shown in FIGS. 13A to 13C. Upon making the convolution operation of image data shown in FIG. 13A and filter parameters shown in FIG. 13B, arithmetic processing shown in FIG. 13C is executed.

Div in equation (13a) is a sum of elements of the filter parameters (FIG. 13B). Com in equation (13b) is a convolution operation result of the image data (FIG. 13A) and filter parameters (FIG. 13B). Val in equation (13c) is a result obtained by dividing the convolution operation result Com by Div as the sum of the elements of the filter parameters (FIG. 13B) so as to normalize Com. Filtering is implemented by returning this value to the position of a pixel of interest 1301.

Referring back to FIG. 11, reference numeral 1110 denotes an image signal obtained after the aforementioned filtering is applied to the image signal 1101. That is, the image signal 1110 is the adaptive application result of the smoothing filter (FIG. 12A) and edge emphasis filter (FIG. 12B) to the image signal 1101 according to the attribute flags 1106. Signal values of the character edge 1103 before filtering remain unchanged to obtain a character part 1113.

On the other hand, bordering (gray) 1111 is generated in a background 1112 after filtering. Since this bordering 1111 is generated to border the character, it considerably impairs the character quality.

Figure 14:
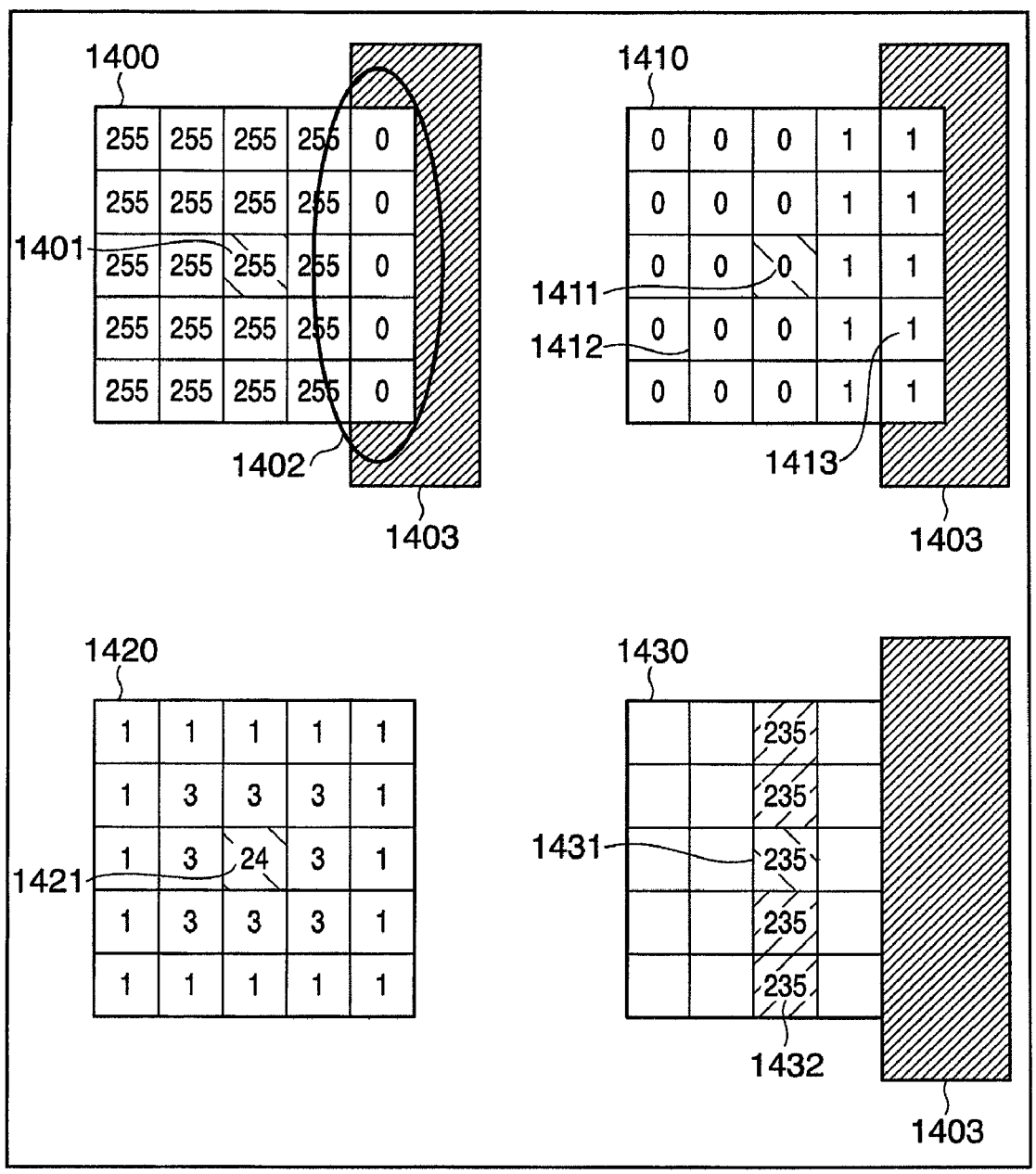
FIG. 14 is a view for explaining bordering of a character which is generated on a background area.

This phenomenon will be specifically explained using FIG. 14 in accordance with the description of filtering shown in FIGS. 13A to 13C. An image signal 1400 undergoes filtering using filter parameters 1420. Assuming that the filter size is defined by 5×5 pixels, if the pixel of interest is denoted by 1401, one column 1402 on a character edge 1403 of pixels to be filtered includes pixel data on the edge. Since this column also undergoes the convolution operation by weights given by the filter parameters 1420, the image data 1402 on the character edge strongly influences the arithmetic result.

Upon execution of filtering based on equations shown in FIG. 13C, we have:

$Div=64$ $Com=15045$ $Val=235$

The pixel value of Val is assigned to a pixel of interest 1431 of an image signal 1430 after filtering. Upon practicing the similar arithmetic operation for the entire image, signal values 1432 which look like bordering are generated outside the character edge 1403, thus considerably deteriorating the character quality.

Hence, the embodiment according to the present invention has as its object to improve the image quality of a character part and photo (background) part by executing suited adaptive filtering without deteriorating the character quality. More specifically, the object of the embodiment is to suppress bordering generated around a character as a cause of deterioration of the image quality.

First Embodiment

Filtering control in the first embodiment for suppressing bordering generated around a character will be described in detail below with reference to FIGS. 15 and 16. Note that the first embodiment changes the filter size of filtering according to attributes indicating features for respective pixels. Note also that the attributes indicate a character or line image, halftone dot, background, and the like based on flag data determined by, for example, the image area separation processing.

Figure 15:
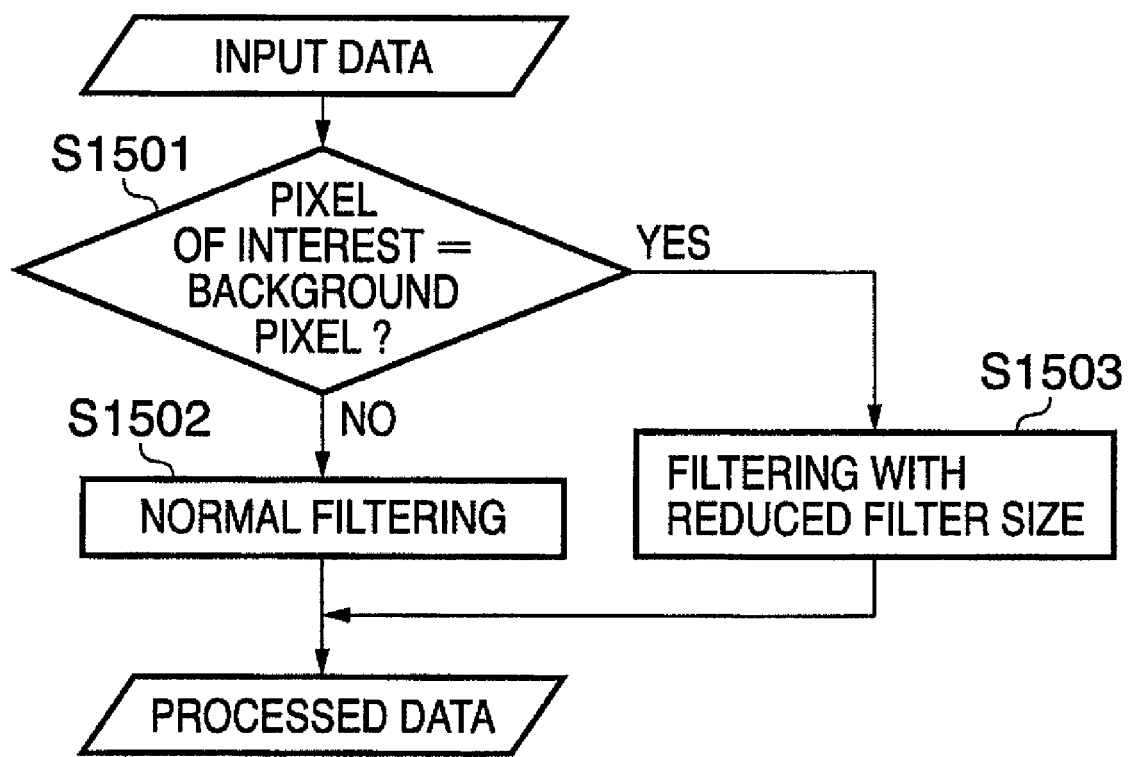
FIG. 15 is a flowchart showing filtering control in the first embodiment.

FIG. 15 is a flowchart showing filtering control in the first embodiment. It is checked if the pixel of interest of an image signal as input data belongs to a background area (S1501). In this embodiment, the image signal undergoes the aforementioned image area separation processing to generate attribute flags indicating character and halftone flags, and the above checking step is implemented based on the attribute flags. Assume that the background area is an area which is neither a character area nor a halftone area.

If it is determined in step S1501 that the pixel of interest does not belong to the background area, normal filtering is executed (S1502). Note that the normal filtering is processing that uses a character filter for the character area and a halftone filter for the halftone area with reference to the attribute flags.

On the other hand, if it is determined in step S1501 that the pixel of interest belongs to the background area, filtering is executed after the filter size is reduced (S1503). This filtering with the reduced filter size will be described in detail below with reference to FIG. 16.

Figure 16:
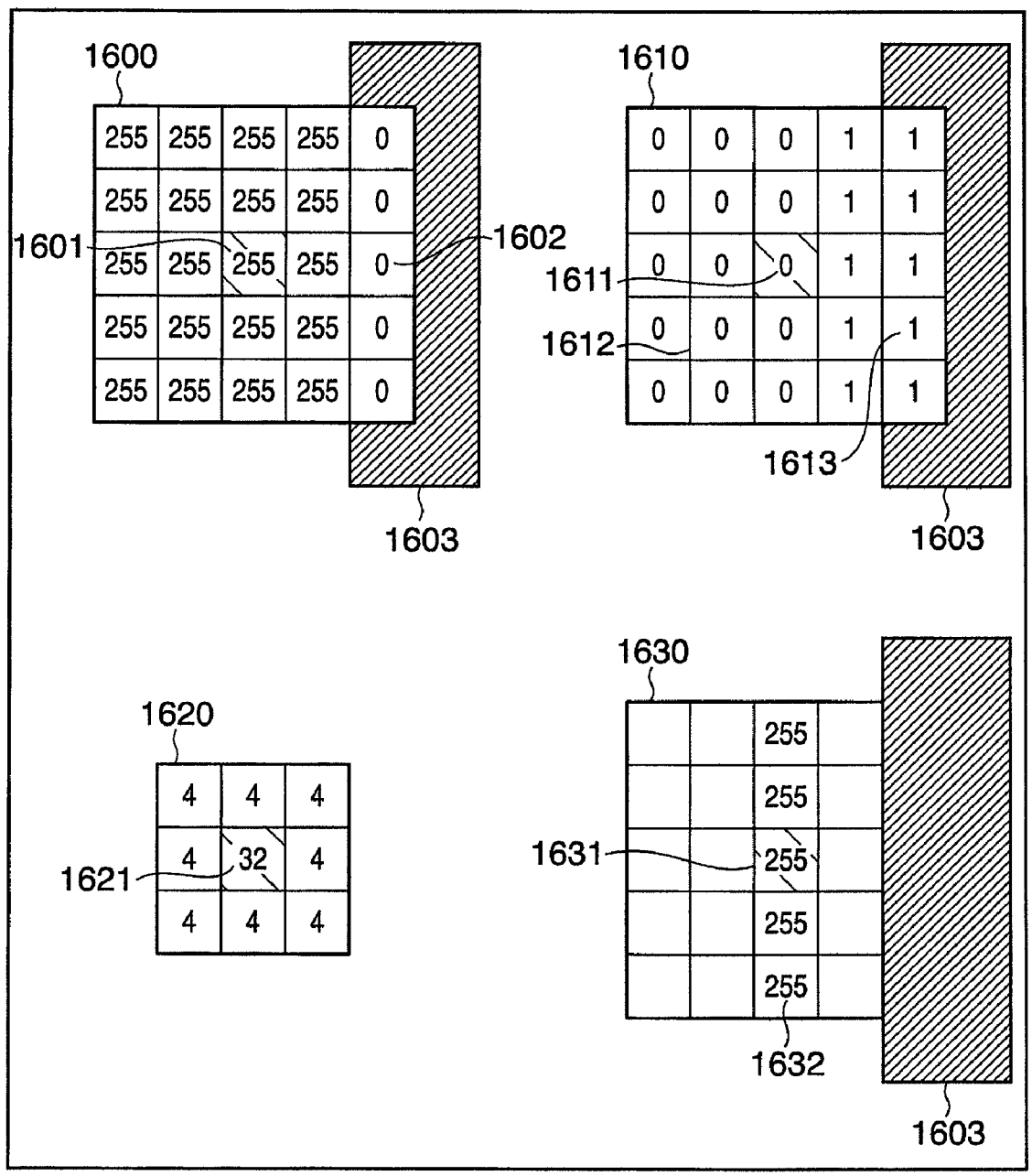
FIG. 16 is a view for explaining filtering in the first embodiment.

FIG. 16 is a view for explaining filtering in the first embodiment. As shown in FIG. 16, an image signal 1600 defines an image which has a pixel 1601 as a pixel of interest, and has an image part to be filtered included in a character edge 1603. In this case, since the pixel of interest belongs to the background area, the image signal 1600 undergoes filtering using filter parameters 1620 whose filter size is reduced from 5×5 to 3×3 with reference to attribute flags 1610.

The attribute flags 1610 shown in FIG. 16 will be described below with reference to FIG. 17. When the aforementioned image area separation processor 202 detects a character area and halftone area, the attribute flags of these areas have meanings shown in FIG. 17. That is, when a pixel is not determined as a halftone pixel but it is determined only as a character pixel, a character flag (attribute: 1) is set for that pixel. Conversely, if a pixel is not determined as a character pixel but it is determined only as a halftone pixel, a halftone flag (attribute: 2) is set for that pixel.

Since determination is made pixel by pixel, and both the attributes are never determined at the same time, when neither of these attributes are determined, the area is determined to be neither a character area nor a halftone area. That is, the area is determined to be a flat area such as a background area or the like having no density difference (attribute: 0).

In this way, the attributes shown in FIG. 17 indicate to which of the character area, halftone area, background area, and the like the pixel of interest belongs.

Referring to the attribute flags 1610 in FIG. 16, pixels 1612 indicated by "0" are those which have a background flag (attribute: 0). Also, pixels 1613 indicated by "1" are whose which have a character flag (attribute: 1). With reference to these flags, filtering is done according to the processing shown in FIG. 15.

Since the processing to be applied to a character part is the same as that in the prior art, a description thereof will not be made. However, this processing uses edge emphasis filter coefficients. For other areas, since they are non-character areas, smoothing filter coefficients are used in the prior art. However, in this embodiment, filter coefficients with a reduced filter size are used according to the background flag. For example, the filter coefficients 1620 are used.

Upon executing filtering based on equations (13a) to (13c) shown in FIG. 13C described above, we have:

$Div=64$ $Com=16320$ $Val=16320/64=255$

The pixel value of Val is assigned to a pixel of interest 1631 of an image signal 1630 after filtering. Therefore, even when similar processing is applied to the entire image, since the filter size is reduced for the background part near the character with reference to the background flag, no bordering is generated around the character, as denoted by 1632.

As described above, upon execution of filtering, the filter size is adaptively reduced in accordance with the attributes indicating features for respective pixels of an image determined by the image area separation processing. As a result, bordering generated near an edge of a character, line image, or the like due to smoothing processing can be suppressed, and the character quality can be improved. In particular, since the halftone part and background part are distinguished from each other, appropriate smoothing processing can be applied to the halftone part, thus suppressing moiré and the like upon printing.

Second Embodiment

The second embodiment according to the present invention will be described in detail hereinafter with reference to the accompanying drawings. In the first embodiment, the method of adaptively reducing the filter size in accordance with the attributes indicating features for respective pixels of an image, which are determined by the image area separation processing, has been explained. However, in case of the first embodiment, since the same processing is executed even for the background part without any character edge, its necessity is not always required.

Hence, in the second embodiment, a method of controlling the filter size with reference to a character edge so as to maximize the effect of smoothing on the background part will be described below with reference to FIG. 18.

Figure 18:
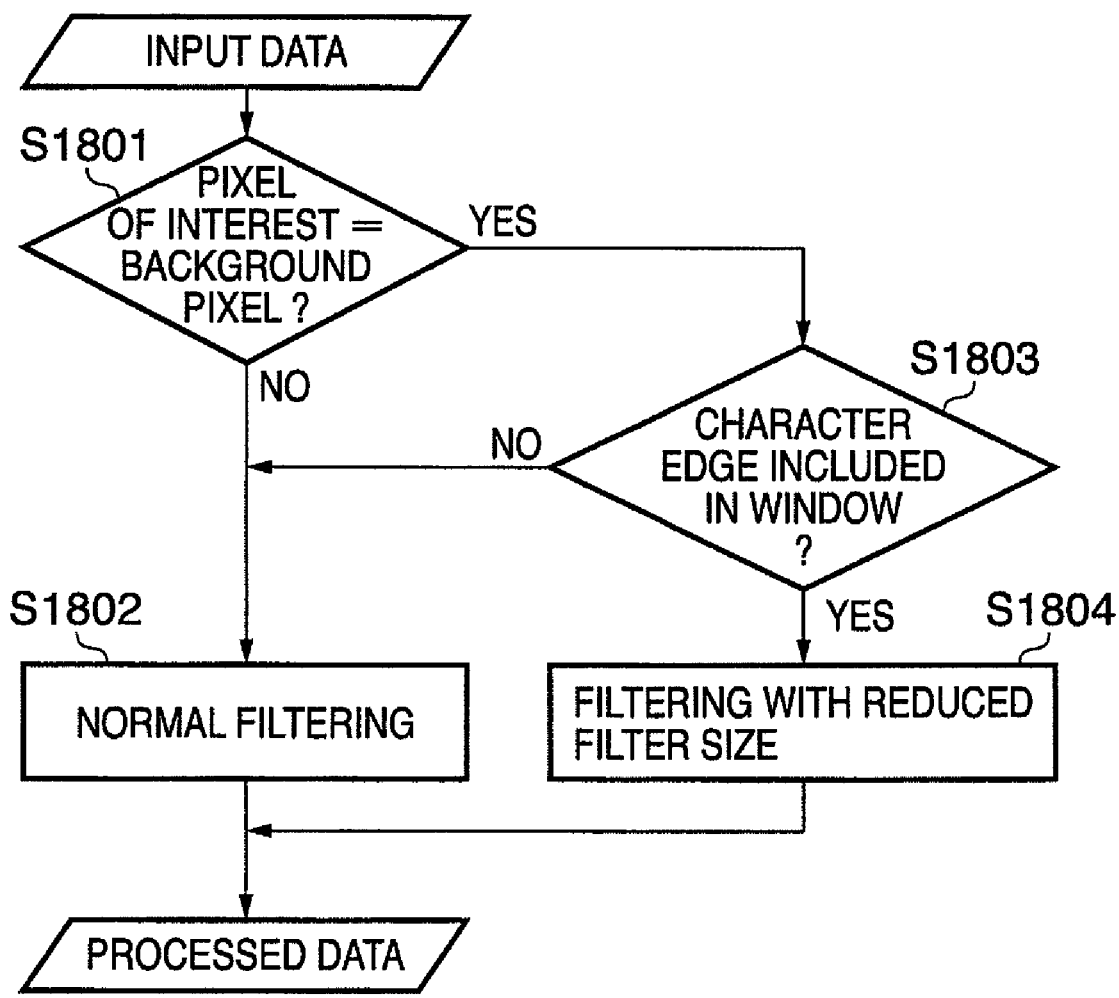
FIG. 18 is a flowchart showing filtering control in the second embodiment.

FIG. 18 is a flowchart showing filtering control in the second embodiment. Note that steps S1801 and S1802 are the same processes as in steps S1501 and S1502 shown in FIG. 15 of the first embodiment, and a description thereof will not be repeated.

If it is determined in step S1801 that the pixel of interest belongs to the background area, it is checked with reference to attribute flags of an area to be filtered except for the pixel of interest if the area to be filtered includes character flags (character edge) (S1803). As a result, if the area to be filtered does not include any character edge, normal filtering is executed (S1802). On the other hand, if the area to be filtered includes a character edge, filtering is executed after the filter size is reduced (S1804).

Note that the filtering with a reduced filter size is the same as that of the first embodiment described with reference to FIGS. 16 and 17, and a description thereof will not be given.

As described above, whether or not the character edge exists near an area determined as the background part, the filter size is reduced near the character edge, thus suppressing bordering. If no character edge exists near the background part, smoothing processing with the same level as the halftone part is applied to remove noise components of the background part, thus allowing smooth reproduction.

Third Embodiment

The third embodiment according to the present invention will be described in detail hereinafter with reference to the accompanying drawings. In the second embodiment, the method of controlling the filter size with reference to a character edge so as to maximize the effect of smoothing on the background part has been explained. However, such an image processing system has the background removal function of reproducing a copy image of a document after removing the background color of paper so as to improve the reproducibility of the copy image. For this reason, smoothing of the background part need not always be required in some cases.

Hence, in the third embodiment, filtering control that considers the background removal function will be described below with reference to FIG. 19.

Figure 19:
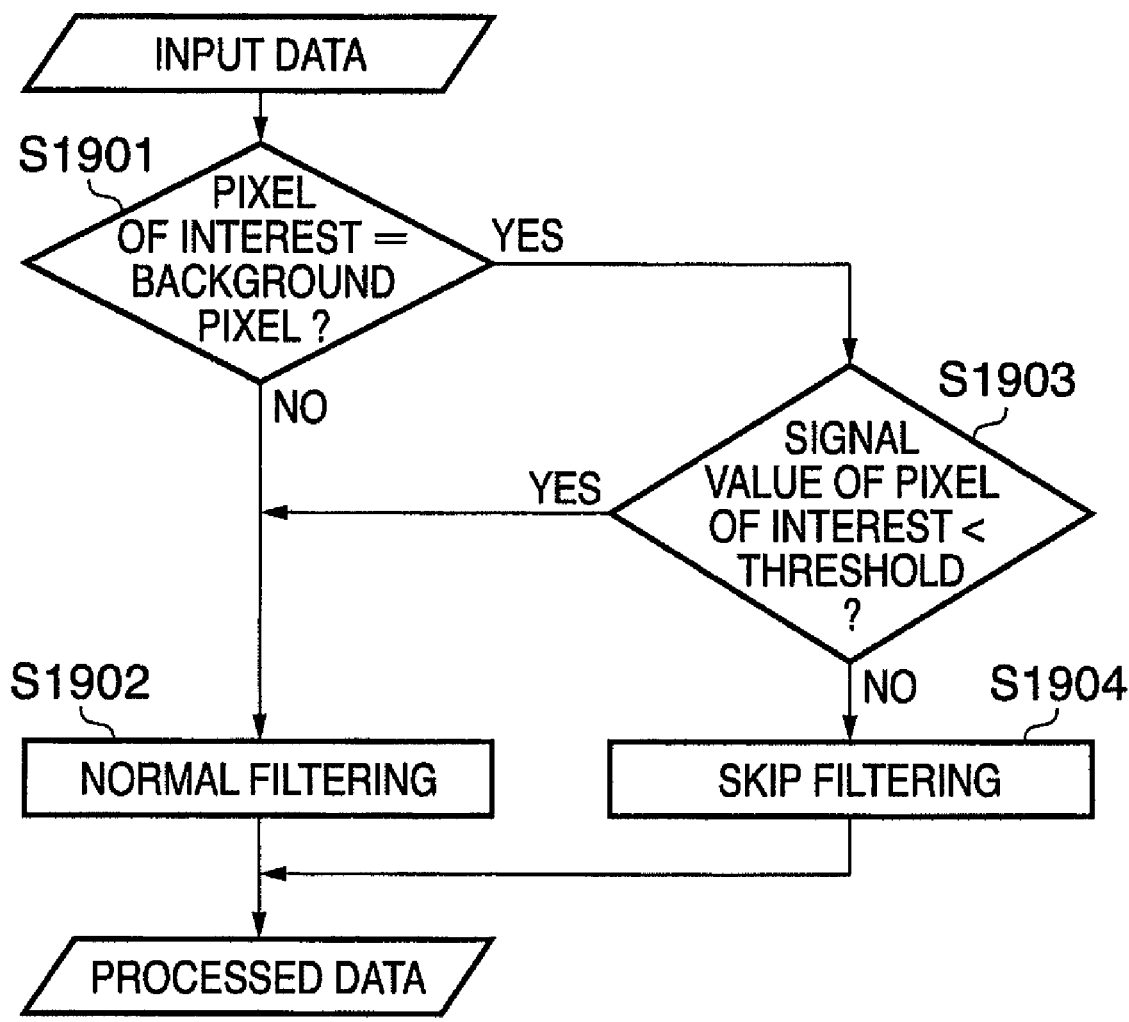
FIG. 19 is a flowchart showing filtering control in the third embodiment.

FIG. 19 is a flowchart showing filtering control in the third embodiment. Note that steps S1901 and S1902 are the same processes as in steps S1501 and S1502 shown in FIG. 15 of the first embodiment, and a description thereof will not be repeated.

If it is determined in step S1901 that the pixel of interest belongs to the background area, it is checked if a signal value (luminance value) of the pixel of interest is smaller than a threshold (S1903). As a result, if the signal value (luminance value) of the pixel of interest is smaller than the threshold, normal filtering is executed (S1902). On the other hand, if the signal value of the pixel of interest is larger than the threshold, filtering is not applied (S1904). When the signal value of the pixel of interest is equal to the threshold, one of these processes is arbitrarily applied.

In the third embodiment, the output image processor 215 shown in FIG. 2 includes the background removal processing 901. This function removes the background of a scanned document, and is used to improve the image quality of an output material. For example, upon scanning a document, the paper of which is nearly white but is not stark white, its scanned values of the background part do not assume 255 in case of 8-bit RGB signals. For example, all of R, G, and B values assume luminance values such as 240 and the like. When this image signal undergoes output image processing intact, the background is printed at a certain density. Such background color is visually not preferable, and toner and the like are consumed unwantedly since printing is done on an unnecessary place.

To avoid this problem, the function of removing the background in accordance with a predetermined value or a value figured out by calculating a histogram of a document is equipped.

Using this background removal function, signal values of a certain scanned level or higher can be removed. In consideration of this background removal processing, a value that considers signal levels to be removed by background removal is set as a threshold for an area which is determined as a background area, and filter processing is not applied to luminance signals larger (=that is, brighter) than the threshold. It will be described more specifically hereinafter.

When smoothing processing is applied in the vicinity of edges, bordering is generated because the smoothing processing processes signals of the edges. If the amount of brightness level of bordering is larger than the amount of brightness level removed by the background removal processing, the bordering is removed. On the other hand, if the amount of brightness level of bordering is small than the amount of the removed brightness level, the background is removed. However, the bordering might be not removed. Under normal circumstances, since the amount of background level including the signals of the edges drops (thicken up), the background (bordering) to be removed by the background removal processing is not removed. Therefore, the smoothing processing is not applied in the background being background levels to be removed normally. In this way, bordering (gray) can be prevented from being generated, or can be eliminated. And the bordering is perfectly removed by the background removal processing.

Note that the aforementioned filter processing is based on RGB signals. However, other color spaces such as CMYK and the like may be used. Note that the relationship with a threshold to be set at that time must be determined as needed depending on the color space used.

Figure 20:
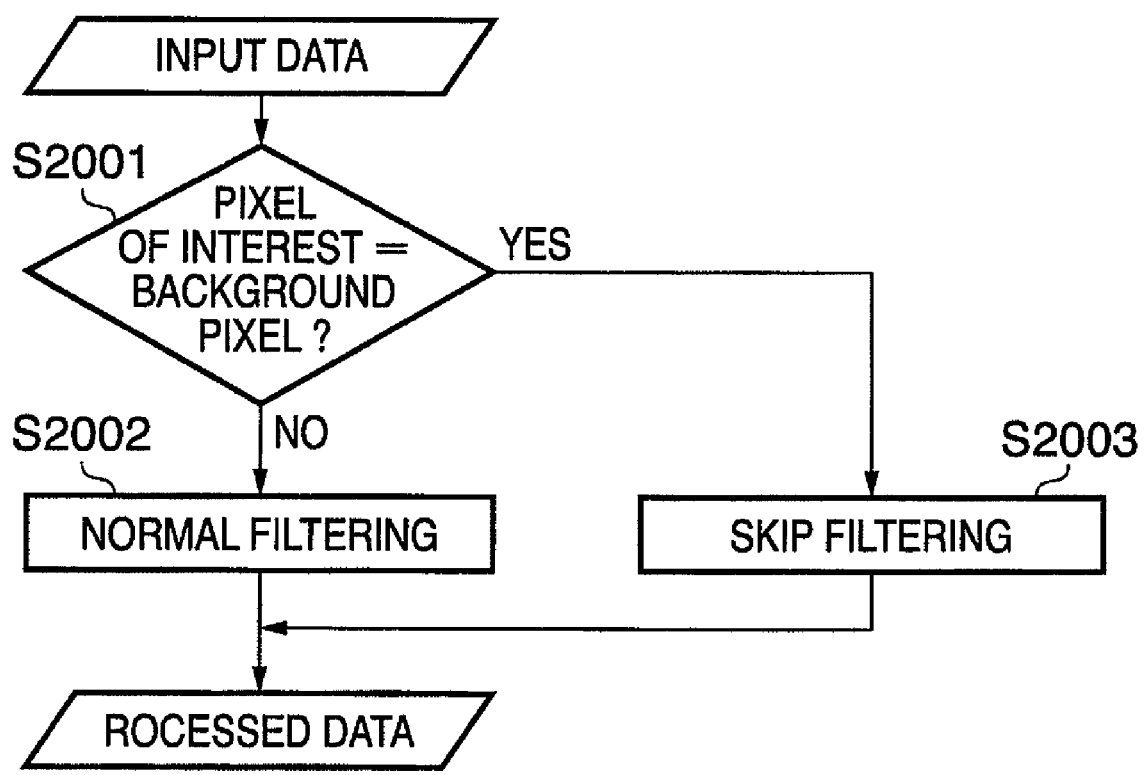
FIG. 20 is a flowchart showing filtering control in a modification of the third embodiment.

In the third embodiment, whether or not to skip filtering is determined in accordance with the scanned level of the background area. Alternatively, as shown in FIG. 20, control may be made to skip filtering (S2003) if the pixel of interest belongs to the background area.

As described above, in case of the background area, whether or not to apply filtering is determined based on the threshold that considers signal levels to be removed by the background removal processing, thus suppressing bordering and the like which lower the character reproducibility.

Fourth Embodiment

The fourth embodiment according to the present invention will be described in detail hereinafter with reference to the drawings. In the third embodiment, control is made to skip filtering when signal levels (luminance levels) are equal to or higher than an arbitrary signal level in case of a background area in consideration of the signal levels (luminance levels) to be removed by the background removal processing. However, when the background is not removed sufficiently, bordering may be generated around a character or line image.

In the fourth embodiment, filtering control that reduces the filter size in consideration of the background removal function as in the third embodiment and with reference to the character edge as in the first embodiment will be described below with reference to FIG. 21.

Figure 21:
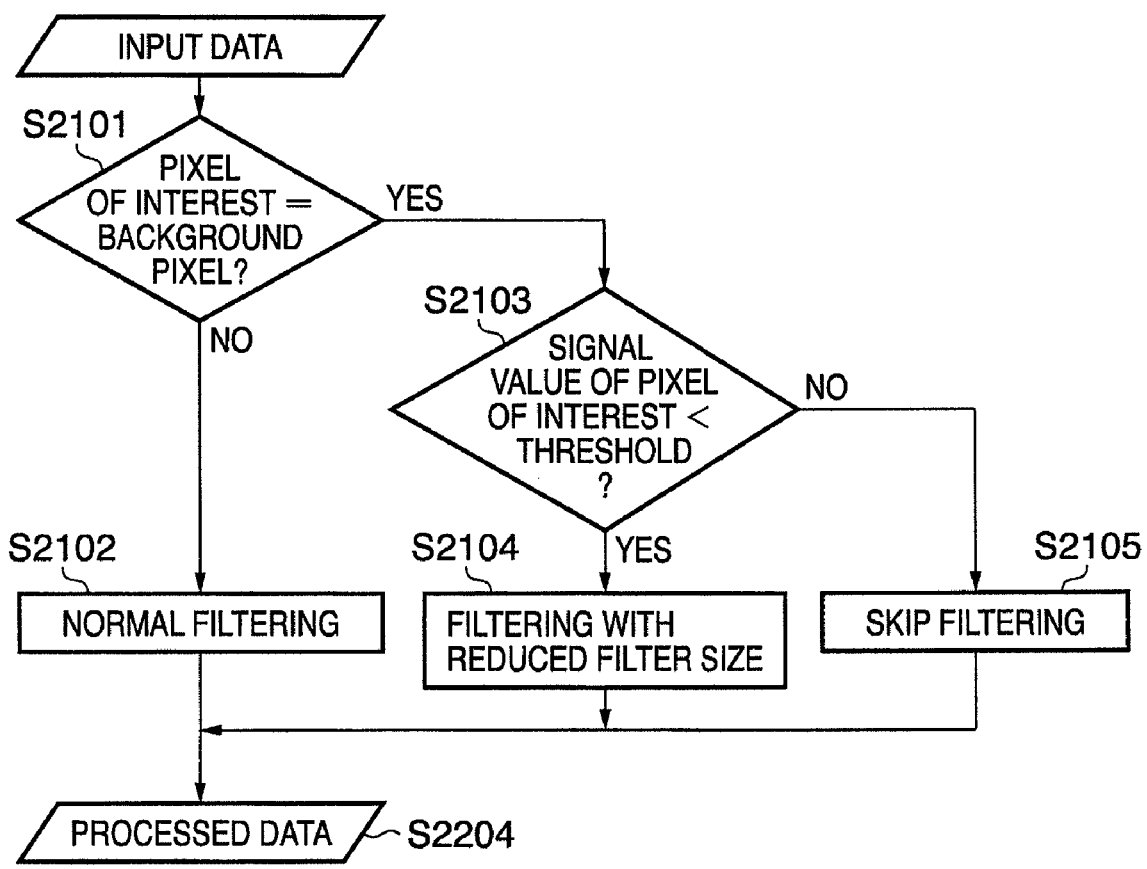
FIG. 21 is a flowchart showing filtering control in the fourth embodiment.

FIG. 21 is a flowchart showing filtering control in the fourth embodiment. Note that step S2105 executed if NO in steps S2101 and S2103 corresponds to the process in step S1904 executed if NO in steps S1901 and S1903 shown in FIG. 19 of the third embodiment, and a description thereof will not be given.

In the third embodiment, if YES in step S1903, that is, if the signal value of the pixel of interest is smaller than the threshold, normal filtering is executed. However, in the fourth embodiment, filtering is executed after the filter size is reduced (S2104). If the signal value of the pixel of interest is equal to the threshold, one of these processes is arbitrarily applied as in the third embodiment.

In the fourth embodiment, if the signal level to be removed by the background removal function is high (close to 255 in case of RGB 8-bit signals), and the amount of background level to be removed is small, background signals around a character that causes bordering may often be completely removed. Hence, filtering is skipped for pixels which belong to the background area and have signal values larger than a threshold, and filtering with a reduced filter size is executed for pixels which belong to the background area and have signal values smaller than a threshold. That is, filtering is not applied in fields to be removed by the background removal processing and the smoothing processing is applied in the fields. Thereby, bordering can be prevented from being generated. Furthermore, filtering with a reduced filter size is executed for fields without removing. Thereby, bordering can be withheld from being generated. Accordingly, by executing double processing, bordering can be removed in a case where the amount of background removal is a little.

As in the third embodiment, other color spaces such as CMYK and the like may be used. The relationship with the threshold at that time must be determined as needed in accordance with the color space used.

As described above, whether or not to apply filtering is determined based on the threshold that considers signal levels to be removed by the background removal processing. Since the filter size is reduced upon applying filtering, bordering that lowers the character reproducibility can be suppressed.

According to the embodiments described above, upon executing the smoothing processing around a character, the filter size is reduced in place of decreasing weights of an edge part in filtering. In this manner, noise generated at the character edge can be removed without complicating the circuit arrangement.

Note that the present invention may be applied to either a system constituted by a plurality of devices (e.g., a host computer, interface device, reader, printer, and the like), or an apparatus consisting of a single device (e.g., a copying machine, facsimile apparatus, or the like).

A recording medium, which records a program code of software that can implement the functions of the aforementioned embodiments, is supplied to the system or apparatus, and a computer (or a CPU or MPU) of the system or apparatus reads out and executes the program code stored in the recording medium. In this way, the objects of the present invention can be achieved.

In this case, the program code itself read out from the recording medium implements the functions of the aforementioned embodiments, and the recording medium which stores the program code constitutes the present invention.

As the recording medium used to supply the program code, for example, a flexible disk, hard disk, optical disk, magneto-optical disk, CD-ROM, CD-R, magnetic tape, nonvolatile memory card, ROM, and the like can be used.

The functions of the aforementioned embodiments can be implemented not only when the computer executes the readout program code but also in the following case. That is, this is the case wherein an OS (operating system) or the like which runs on the computer executes some or all of actual processing operations based on instructions of the program code to implement the functions of the aforementioned embodiments.

Furthermore, the present invention also includes the following case. That is, the program code read out from the recording medium is written in a memory equipped on a function expansion board or function expansion unit, which is inserted into or connected to the computer. After that, a CPU or the like equipped on the function expansion board or unit executes some or all of actual processing operations based on instructions of the program code to implement the functions of the aforementioned embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-182, filed Jun. 30, 2006, which is hereby incorporated by reference herein in its entirety.

What is claimed is:

1. An image processing apparatus comprising:
an attribute determination unit adapted to determine attributes including at least character and background for respective pixels of an image; and
a filtering unit adapted to weight pixel values in either an M×M (M being a natural number) area including a pixel of interest, using an M×M filter, or an N×N (N being a natural number less than M) area including the pixel of interest, using an N×N filter, in accordance with the attributes determined by said attribute determination unit, and
to change a pixel value of the pixel of interest based on the weighted pixel values,
wherein edge emphasis processing is performed using the M×M filter by said filtering unit in a case where it is determined by said attribute determination unit that an attribute of the pixel of interest indicates the character, and smoothing processing is performed using the N×N filter by said filtering unit in a case where the it is determined by said attribute determination unit indicate that the attribute of the pixel of interest indicates the background;

wherein the smoothing processing is performed using the N×N filter in a case where the attribute of the pixel of interest indicates the background and the attribute of another pixel in the M×M area indicates the character, and the smoothing processing is performed using the M×M filter in a case where the attribute of the pixel of interest indicates background and the attribute of every other pixel in the M×M area does not indicate the character.

2. The apparatus according to claim 1, further comprising:

a background level detection unit adapted to detect a brightness level of a background area of the image; and a decision unit adapted to decide whether or not the smoothing processing is to be performed based on the attributes determined by said attribute determination unit and the brightness level detected by said background level detection unit.

3. The apparatus according to claim 2, wherein the smoothing processing is not to be performed in a case where the attribute of the pixel of interest indicates the background and the brightness level of the background area is larger than a predetermined value.

4. The apparatus according to claim 2, wherein the smoothing processing is performed using the N×N filter in a case where the attribute of the pixel of interest indicates the background and the brightness level of the background area detected by said background level detection unit is below a predetermined value.

5. The apparatus according to claim 1, wherein the attributes determined by said attribute determination unit include a halftone dot.

6. An image processing method comprising:

an attribute determination step of determining attributes including at least character and background for respective pixels of an image; and a filtering step of weighting pixel values in either an M×M (M being a natural number) area including a pixel of interest, using an M×M filter, or an N×N (N being a natural number less than M) area including the pixel of interest, using an N×N filter, in accordance with the attributes determined in said attribute determination step, and changing a pixel value of the pixel of interest based on the weighted pixel values, wherein, in the filtering step, edge emphasis processing is performed using the M×M filter in a case where it is determined in said attribute determination step that an attribute of the pixel of interest indicates the character, and smoothing processing is performed using the N×N filter in a case where it is determined in said attribute determination step that the attribute of the pixel of interest indicates the background, wherein the smoothing processing is performed using the N×N filter in a case where the attribute of the pixel of interest indicates the background and the attribute of another pixel in the M×M area indicates the character, and the smoothing processing is performed using the M×M filter in a case where the attribute of the pixel of interest indicates background and the attribute of every other pixel in the M×M area does not indicate the character.

7. A non-transitory computer-readable recording medium recording a program for making a computer execute an image processing method according to claim 6.

* * * * *